United States Patent
Sako et al.

(10) Patent No.: US 9,615,173 B2
(45) Date of Patent: Apr. 4, 2017

(54) INFORMATION PROCESSING SYSTEM AND STORAGE MEDIUM

(71) Applicant: SONY CORPORATION, Tokyo (JP)

(72) Inventors: Yoichiro Sako, Tokyo (JP); Katsuhisa Aratani, Kanagawa (JP); Kazuyuki Sakoda, Chiba (JP); Kohei Asada, Kanagawa (JP); Mitsuru Takehara, Tokyo (JP); Takatoshi Nakamura, Kanagawa (JP); Kazuhiro Watanabe, Tokyo (JP); Akira Tange, Tokyo (JP); Hiroyuki Hanaya, Kanagawa (JP); Yuki Koga, Tokyo (JP); Tomoya Onuma, Shizuoka (JP)

(73) Assignee: SONY CORPORATION, Tokyo (JP)

( * ) Notice: Subject to any disclaimer, the term of this patent is extended or adjusted under 35 U.S.C. 154(b) by 81 days.

(21) Appl. No.: 14/404,733

(22) PCT Filed: Apr. 23, 2013

(86) PCT No.: PCT/JP2013/061894
§ 371 (c)(1),
(2) Date: Dec. 1, 2014

(87) PCT Pub. No.: WO2014/017134
PCT Pub. Date: Jan. 30, 2014

(65) Prior Publication Data
US 2015/0189435 A1 Jul. 2, 2015

(30) Foreign Application Priority Data
Jul. 27, 2012 (JP) .................................. 2012-166977

(51) Int. Cl.
*H04R 3/00* (2006.01)
*G10L 25/51* (2013.01)
(Continued)

(52) U.S. Cl.
CPC .............. *H04R 3/005* (2013.01); *G10L 25/51* (2013.01); *H04S 7/303* (2013.01);
(Continued)

(58) Field of Classification Search
CPC ........ H04R 3/005; G10L 125/51; H04S 7/303
See application file for complete search history.

(56) References Cited

U.S. PATENT DOCUMENTS 9,277,178 B2 * 3/2016 Onuma .................... H04M 3/42
2006/0165242 A1 * 7/2006 Miki ....................... H04R 3/005
381/59

(Continued)

FOREIGN PATENT DOCUMENTS

JP 9-261351 A 10/1997
JP 2006-155472 A 6/2006
(Continued)

OTHER PUBLICATIONS

International Search Report issued Jun. 11, 2013 in PCT/JP2013/061894.

*Primary Examiner* — Regina N Holder
(74) *Attorney, Agent, or Firm* — Chip Law Group

(57) ABSTRACT

Provided is an information processing system including a recognizing unit configured to recognize a first target and a second target on the basis of signals detected by a plurality of sensors arranged around a specific user, an identifying unit configured to identify the first target and the second target recognized by the recognizing unit, an estimating unit configured to estimate a position of the specific user in accordance with the a signal detected by any one of the plurality of sensors, and a signal processing unit configured to process each of signals acquired from sensors around the first target and the second target identified by the identifying unit in a manner that, when being output from a plurality of actuators arranged around the specific user, the signals are (Continued)

localized near the position of the specific user estimated by the estimating unit.

17 Claims, 28 Drawing Sheets

(51) Int. Cl.
*H04S 7/00* (2006.01)
*H04R 1/40* (2006.01)
*H04R 3/12* (2006.01)
*H04R 5/04* (2006.01)
*G10L 21/0272* (2013.01)
*G10L 21/0216* (2013.01)

(52) U.S. Cl.
CPC .... *G10L 21/0272* (2013.01); *G10L 2021/02166* (2013.01); *H04R 1/403* (2013.01); *H04R 1/406* (2013.01); *H04R 3/12* (2013.01); *H04R 5/04* (2013.01); *H04R 2201/401* (2013.01); *H04R 2201/405* (2013.01); *H04R 2430/23* (2013.01); *H04S 2400/15* (2013.01); *H04S 2420/13* (2013.01)

(56) References Cited

U.S. PATENT DOCUMENTS

| | | | |
|---|---|---|---|
| 2010/0182231 | A1 | 7/2010 | Morimiya et al. |
| 2011/0050840 | A1* | 3/2011 | Ryu ............ H04N 7/142 348/14.01 |
| 2015/0208191 | A1* | 7/2015 | Sako ............ H04R 1/403 381/303 |

FOREIGN PATENT DOCUMENTS

| | | |
|---|---|---|
| JP | 2006-279565 A | 10/2006 |
| JP | 2008-227773 A | 9/2008 |
| JP | 2008-543137 A | 11/2008 |
| JP | 2010-130411 A | 6/2010 |
| JP | 2010-170166 A | 8/2010 |

* cited by examiner

FIG. 4
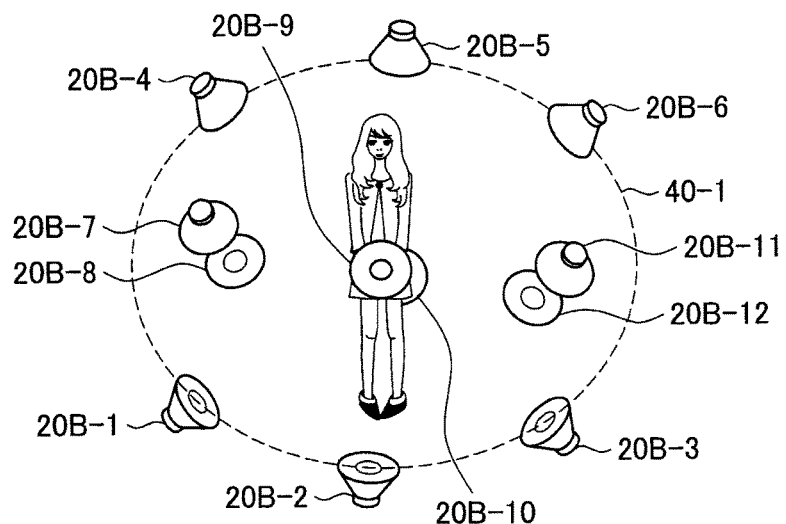
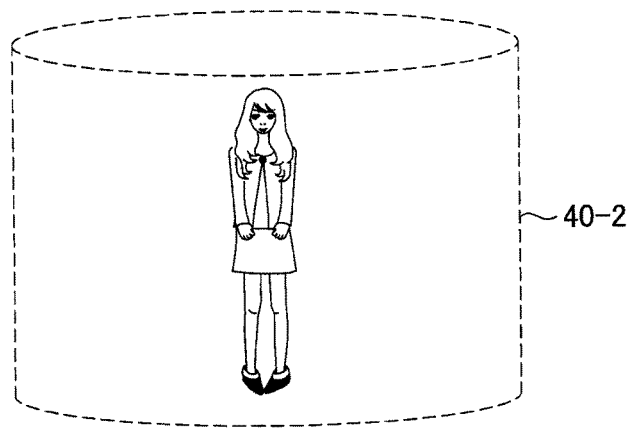
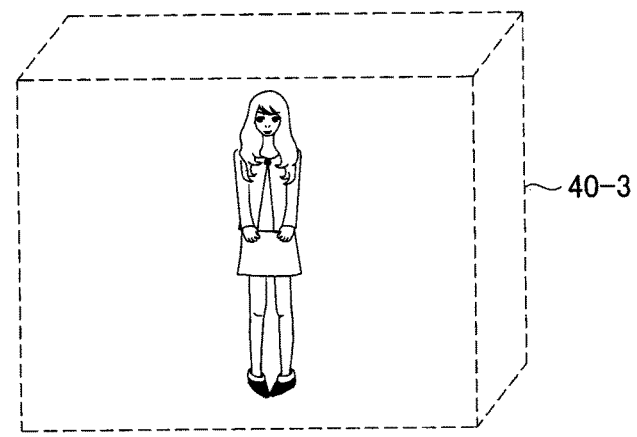

FIG. 12
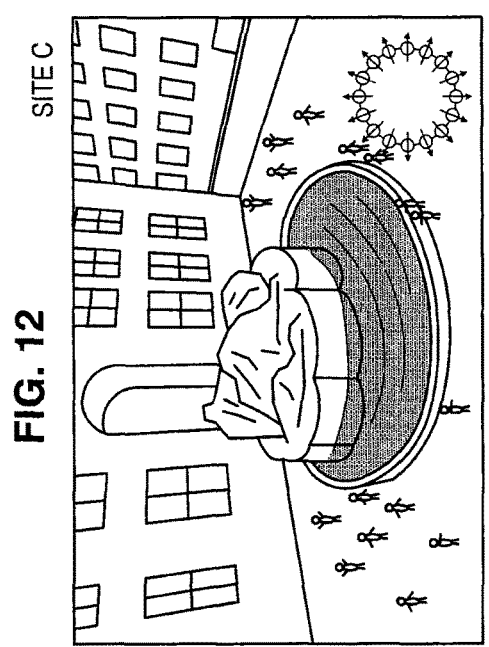
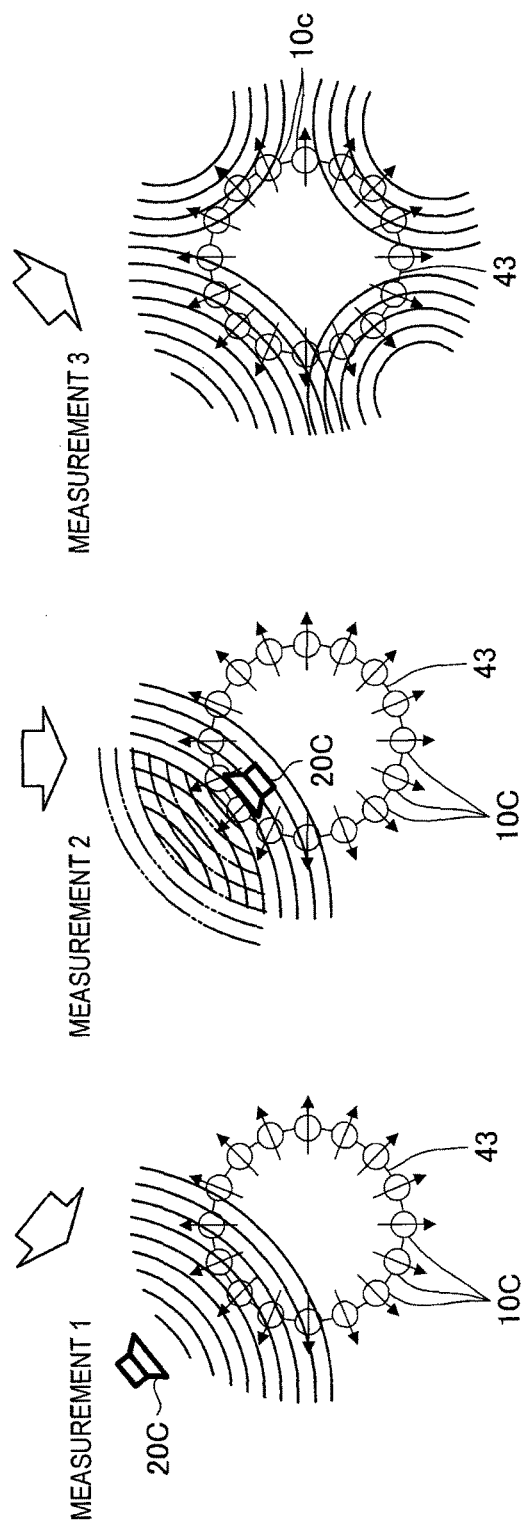

FIG. 14
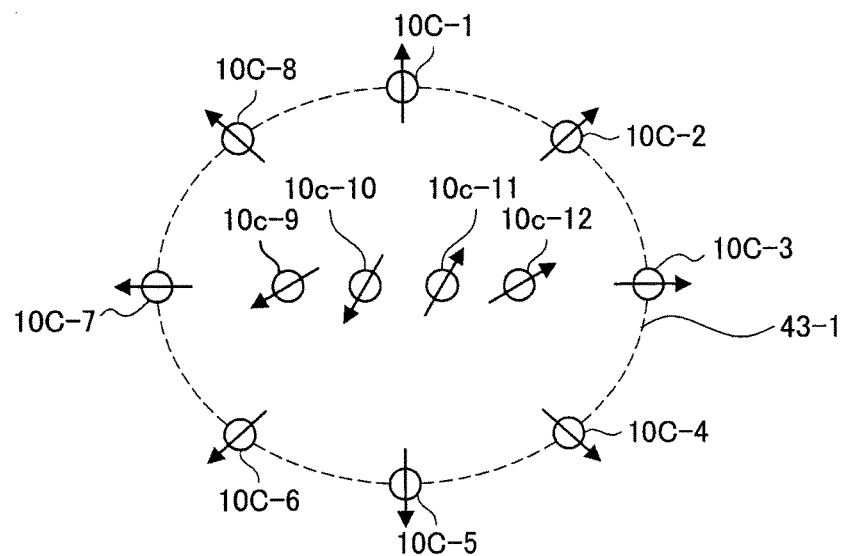
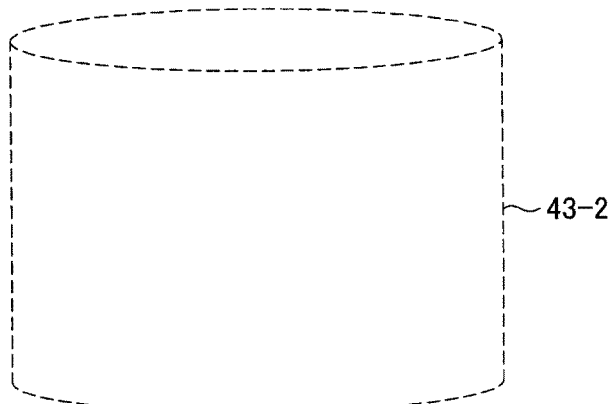
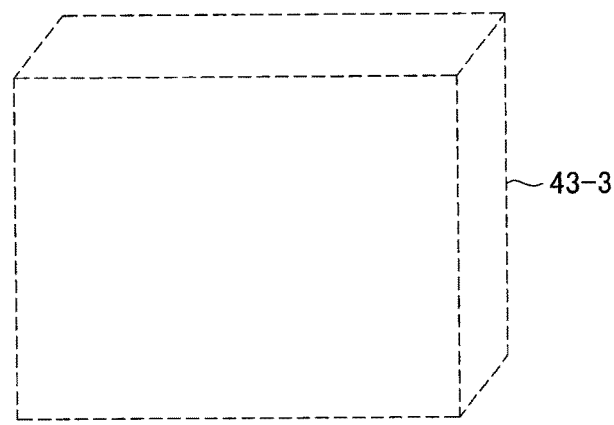

FIG. 16A

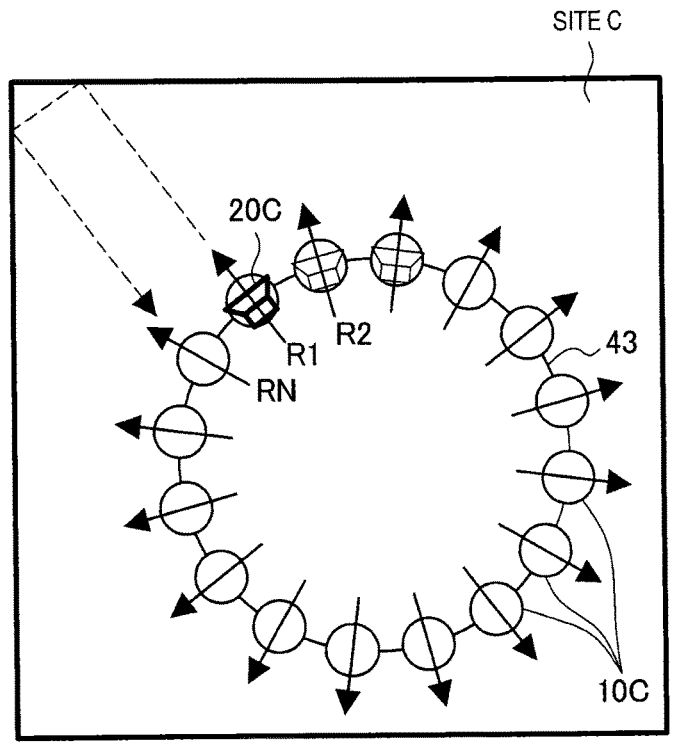

MEASUREMENT OF IMPULSE RESPONSE (TRANSFER FUNCTION)

FROM SP R1→(REFLECTION IN SITE ENVIRONMENT)→TO MICROPHONE R1, R2 ... RN
FROM SP R2→(REFLECTION IN SITE ENVIRONMENT)→TO MICROPHONE R1, R2 ... RN
.........                                                             .........
FROM SP RN→(REFLECTION IN SITE ENVIRONMENT)→TO MICROPHONE R1, R2 ... RN

↓ CONVERSION INTO MATRIX USING TRANSFER FUNCTION R $$\begin{bmatrix} R_{11} & R_{12} & \cdots & R_{1N} \\ R_{21} & R_{22} & \cdots & R_{2N} \\ \vdots & & \ddots & \vdots \\ R_{N1} & \cdots & & R_{NN} \end{bmatrix} \quad \text{EXPRESSION (1)}$$

FIG. 16B

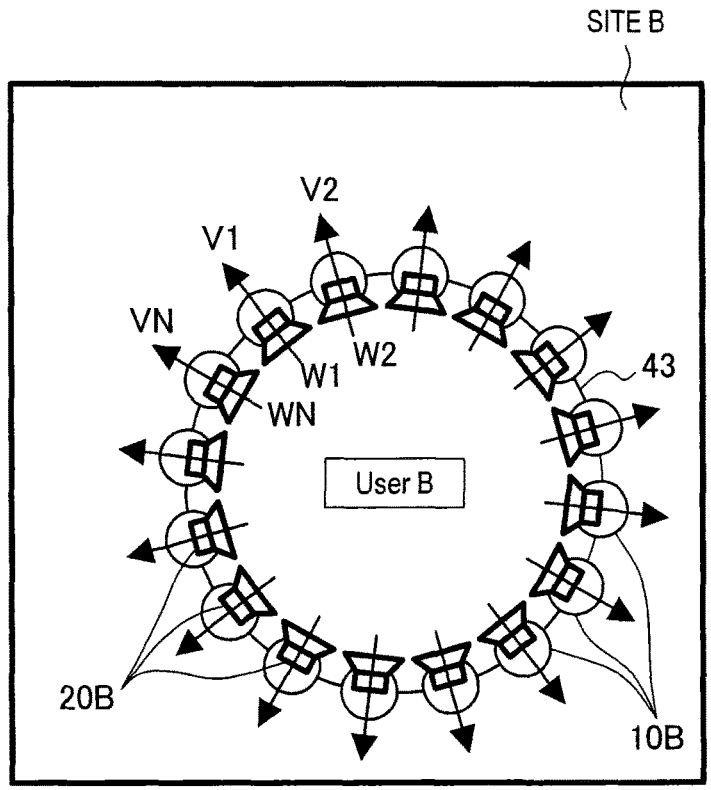

DETERMINE OUTPUT OF EACH SPEAKER USING MATRIX (EXPRESSION (1))
OF TRANSFER FUNCTION GROUP $$\text{SP OUTPUT} \qquad\qquad\qquad\qquad\qquad \text{Mic INPUT}$$

$$\begin{pmatrix} W_1 \\ W_2 \\ \vdots \\ W_N \end{pmatrix} = \begin{pmatrix} R_{11} & R_{12} & \cdots & R_{1N} \\ R_{21} & R_{22} & \cdots & R_{2N} \\ \vdots & & \ddots & \vdots \\ R_{N1} & \cdots & & R_{NN} \end{pmatrix} \begin{pmatrix} V_1 \\ V_2 \\ \vdots \\ V_N \end{pmatrix} \text{EXPRESSION (2)}$$

MEASUREMENT IN MEASUREMENT TARGET SPACE

M MICROPHONES

MEASUREMENT FOR Mch (LARGE CLOSED SURFACE P)

MEASUREMENT OF IMPULSE RESPONSE FROM SP TO MICROPHONE P1, P2 ... PM $$\begin{pmatrix} P_1 \\ P_2 \\ \vdots \\ P_M \end{pmatrix} \text{EXPRESSION (3)}$$

INFORMATION PROCESSING SYSTEM AND STORAGE MEDIUM

TECHNICAL FIELD

The present invention relates to an information processing system and a storage medium.

BACKGROUND ART

In recent years, various technologies have been proposed in data communication fields. For example, Patent Literature 1 below proposes technology related to a Machine-to-Machine (M2M) solution. To be specific, the remote management system written in Patent Literature 1 uses the Internet protocol (IP) multimedia subsystem (IMS) platform (IS), and through disclosure of presence information by a device or instant messaging between a user and a device, an interaction between an authorized user client (UC) and a device client is achieved.

On the other hand, in acoustic technology fields, various types of array speakers that can emit acoustic beams are being developed. For example, Patent Literature 2 below describes array speakers in which a plurality of speakers forming a common wave front are attached to a cabinet and which control amounts of delay and levels of the sounds given out from the respective speakers. Further, Patent Literature 2 below describes that array microphones having the same principle are being developed. The array microphones can voluntarily set the sound acquisition point by adjusting the levels and amounts of delay of output signals of the respective microphones, and thus are capable of acquiring the sound more effectively.

CITATION LIST

Patent Literature

Patent Literature 1: JP 2006-279565A
Patent Literature 2: JP 2008-543137T

SUMMARY OF INVENTION

Technical Problem

However, Patent Literature 1 and Patent Literature 2 described above do not mention anything about technology or a communication method that is understood as means for achieving an augmentation of a user's body by placing many image sensors, microphones, speakers, and the like over a large area.

Accordingly, the present disclosure proposes an information processing system and a storage medium which are novel and improved, and which are capable of providing a feeling of being absorbed in a third space at a time of causing the space surrounding the user to cooperate with another space.

Solution to Problem

According to the present disclosure, there is provided an information processing system including a recognizing unit configured to recognize a first target and a second target on the basis of signals detected by a plurality of sensors arranged around a specific user, an identifying unit configured to identify the first target and the second target recognized by the recognizing unit, an estimating unit configured to estimate a position of the specific user in accordance with the a signal detected by any one of the plurality of sensors, and a signal processing unit configured to process each of signals acquired from sensors around the first target and the second target identified by the identifying unit in a manner that, when being output from a plurality of actuators arranged around the specific user, the signals are localized near the position of the specific user estimated by the estimating unit.

According to the present disclosure, there is provided an information processing system including a recognizing unit configured to recognize a first target and a second target on the basis of signals detected by sensors around a specific user, an identifying unit configured to identify the first target and the second target recognized by the recognizing unit, and a signal processing unit configured to generate signals to be output from actuators around the specific user on the basis of signals acquired by a plurality of sensors arranged around the first target and the second target identified by the identifying unit.

According to the present disclosure, there is provided a storage medium having a program stored therein, the program being for causing a computer to function as a recognizing unit configured to recognize a first target and a second target on the basis of signals detected by a plurality of sensors arranged around a specific user, an identifying unit configured to identify the first target and the second target recognized by the recognizing unit, an estimating unit configured to estimate a position of the specific user in accordance with the a signal detected by any one of the plurality of sensors, and a signal processing unit configured to process each of signals acquired from sensors around the first target and the second target identified by the identifying unit in a manner that, when being output from a plurality of actuators arranged around the specific user, the signals are localized near the position of the specific user estimated by the estimating unit.

According to the present disclosure, there is provided a storage medium having a program stored therein, the program being for causing a computer to function as a recognizing unit configured to recognize a first target and a second target on the basis of signals detected by sensors around a specific user, an identifying unit configured to identify the first target and the second target recognized by the recognizing unit, and a signal processing unit configured to generate signals to be output from actuators around the specific user on the basis of signals acquired by a plurality of sensors arranged around the first target and the second target identified by the identifying unit.

Advantageous Effects of Invention

According to the present disclosure as described above, a feeling of being absorbed in a third space can be provided at a time of causing a space surrounding a user to cooperate with another space.

BRIEF DESCRIPTION OF DRAWINGS

FIG. 4 is a diagram illustrating shapes of acoustically closed surfaces according to the present embodiment.

FIG. 12 is a diagram illustrating measurement of an acoustic parameter.

FIG. 14 is a diagram illustrating shapes of closed surfaces in the measuring environment according to the present embodiment.

FIG. 16A is a diagram illustrating measurement of an impulse response in the site C.

FIG. 16B is a diagram illustrating an arithmetic operation using an impulse response group performed by a matrix convolution unit according to the present embodiment.

DESCRIPTION OF EMBODIMENTS

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

The description will be given in the following order.
1. Outline of acoustic system according to embodiment of present disclosure
2. Basic configuration
  2-1. System configuration
  2-2. Signal processing apparatus
  2-3. Management server
3. Operation process
  3-1. Basic process
  3-2. Command recognition process
  3-3. Sound acquisition process
4. Construction of sound field of third space
  4-1. Configuration of management server
  4-2. Configuration of sound field reproduction signal processing unit
  4-3. Sound field reproduction process
5. Supplement
6. Conclusion <1. Outline of Acoustic System According to Embodiment of Present Disclosure>

Figure 1:
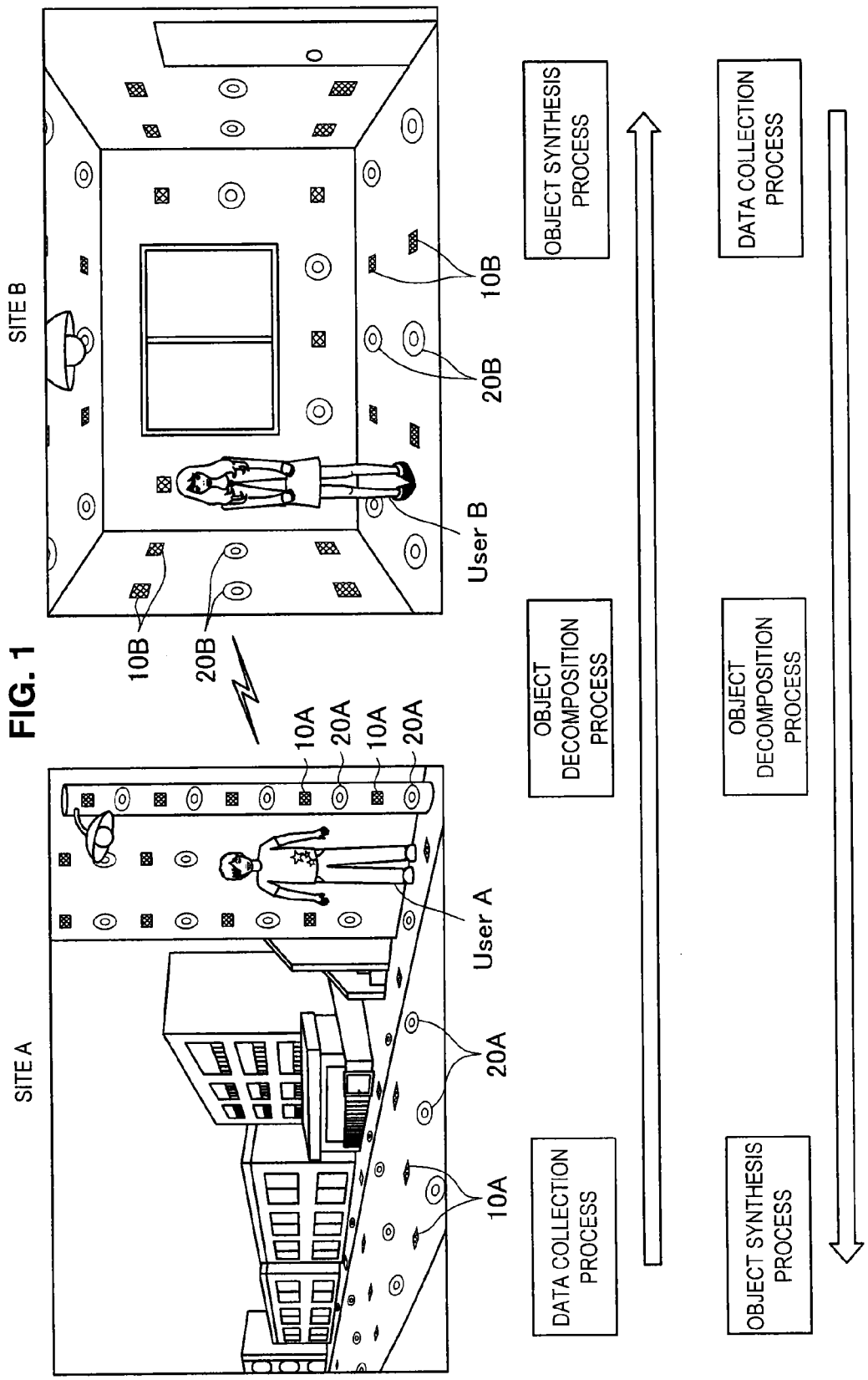
FIG. 1 is a diagram illustrating an outline of an acoustic system according to an embodiment of the present disclosure.

First, with reference to FIG. 1, an outline of an acoustic system (information processing system) according to an embodiment of the present disclosure will be described. FIG. 1 is a diagram illustrating an outline of an acoustic system according to an embodiment of the present disclosure. As shown in FIG. 1, in the acoustic system according to the present embodiment, let us assume the situation in which a large number of sensors and actuators such as microphones 10, image sensors (not shown), and speakers 20 are arranged everywhere in the world such as rooms, houses, buildings, outdoor sites, regions, and countries.

In the example shown in FIG. 1, on a road or the like in an outdoor area "site A" at which a user A is currently located, a plurality of microphones 10A are arranged as examples of the plurality of sensors and a plurality of speakers 20A are arranged as examples of the plurality of actuators. Further, in an indoor area "site B" at which a user B is currently located, a plurality of microphones 10B and a plurality of speakers 20B are arranged on the walls, the floor, the ceiling, and the like. Note that, in the sites A and B, motion sensors and image sensors (which are not shown) may further be arranged as examples of the sensors.

Here, the site A and the site B are connectable to each other through a network, and the signals output from and input to the respective microphones and the respective speakers of the site A and the signals output from and input to the respective microphones and the respective speakers of the site B are transmitted and received between the sites A and B.

In this way, the acoustic system according to the present embodiment reproduces in real time a voice or an image corresponding to a given target (person, place, building, or the like) through a plurality of speakers and a plurality of displays arranged around the user. Further, the acoustic system according to the present embodiment can reproduce around the user in real time the voice of the user that has been acquired by a plurality of microphones arranged around the user. In this way, the acoustic system according to the present embodiment can cause a space surrounding a user to cooperate with another space.

Further, using the microphones 10, the speakers 20, the image sensors, and the like arranged everywhere, indoor sites and outdoor sites, it becomes possible to substantially augment over a large area the body such as the mouth, eyes, ears of the user, and to achieve a new communication method.

In addition, since microphones and image sensors are arranged everywhere in the acoustic system according to the present embodiment, the user does not have to carry a smartphone or a mobile phone terminal. The user specifies a given target using a voice or a gesture, and can establish connection with a space surrounding the given target. Hereinafter, there will be briefly described the application of the acoustic system according to the present embodiment in the case where the user A located at the site A wants to have a conversation with the user B located at the site B.

(Data Collection Process)

At the site A, a data collection process is continuously performed through the plurality of microphones 10A, the plurality image sensors (not shown), the plurality of human sensors (not shown), and the like. Specifically, the acoustic system according to the present embodiment collects voices acquired by the microphones 10A, captured images obtained by the image sensors, or detection results of the human sensors, and estimates the user's position on the basis of the collected information.

Further, the acoustic system according to the present embodiment may select a microphone group arranged at the position at which the user's voice can be sufficiently acquired on the basis of position information of the plurality of microphones 10A which are registered in advance and the user's estimated position. Further, the acoustic system according to the present embodiment performs a microphone array process of a stream group of audio signals acquired by the selected microphones. In particular, the acoustic system according to the present embodiment may perform a delay-and-sum array in which a sound acquisition point is focused on the user A's mouth and can form super directivity of an array microphone. Thus, faint vocalizations such as the user A's muttering can be also acquired.

Further, the acoustic system according to the present embodiment recognizes a command on the basis of the user A's acquired voice, and executes an operation process according to the command. For example, when the user A located at the site A says "I'd like to speak with B," the "call origination request to the user B" is recognized as a command. In this case, the acoustic system according to the present embodiment identifies the current position of the user B, and causes the site B at which the user B is currently located to be connected with the site A at which the user A is currently located. Through this operation, the user A can speak on the telephone with the user B.

(Object Decomposition Process)

An object decomposition process such as sound source separation (separation of a noise component around the user A, a conversation of a person around the user A, and the like), dereverberation, and a noise/echo process is performed on audio signals (stream data) acquired by the plurality of microphones at the site A during a telephone call. Through this process, stream data in which an S/N ratio is high and a reverberant feeling is suppressed is transmitted to the site B.

Considering a case in which the user A speaks while moving, the acoustic system according to the present embodiment can cope with this case by continuously performing the data collection. Specifically, the acoustic system according to the present embodiment continuously performs data collection on the basis of the plurality of microphones, the plurality of image sensors, the plurality of human sensors, and the like, and detects a moving path of the user A or a direction in which the user A is heading. Then, the acoustic system according to the present embodiment continuously updates selection of an appropriate microphone group arranged around the moving user A, and continuously performs the array microphone process so that the sound acquisition point is constantly focused on the moving user A's mouth. Through this operation, the acoustic system according to the present embodiment can cope with a case in which the user A speaks while moving.

Further, separately from stream data of a voice, a moving direction and the direction of the user A or the like is converted into metadata and transmitted to the site B together with the stream data.

(Object Synthesis)

Further, the stream data transmitted to the site B is reproduced through the speakers arranged around the user B located at the site B. At this time, the acoustic system according to the present embodiment performs data collection at the site B through the plurality of microphones, the plurality of image sensors, and the plurality of human sensors, estimates the user B's position on the basis of the collected data, and selects an appropriate speaker group surrounding the user B through an acoustically closed surface. The stream data transmitted to the site B is reproduced through the selected speaker group, and an area inside the acoustically closed surface is controlled as an appropriate sound field. In this disclosure, a surface formed such that positions of a plurality of adjacent speakers or a plurality of adjacent microphones, are connected to surround an object (the user, for example) is referred to conceptually as an "acoustically closed surface." Further, the "acoustically closed surface" does not necessarily configure a perfect closed surface, and is preferably configured to approximately surround the target object (the user, for example).

Further, the sound field may be appropriately selected by the user B. For example, in the case where the user B designates the site A as the sound field, the acoustic system according to the present embodiment reconstructs the environment of the site A in the site B. Specifically, for example, the environment of the site A is reconstructed in the site B on the basis of sound information as an ambience acquired in real time and meta information related to the site A that has been acquired in advance.

Further, the acoustic system according to the present embodiment may control the user A's audio image using the plurality of speakers 20B arranged around the user B at the site B. In other words, the acoustic system according to the present embodiment may reconstruct the user A's voice (audio image) in the user B's ear or outside the acoustically closed surface by forming an array speaker (beam forming). Further, the acoustic system according to the present embodiment may cause the user A's audio image to move around the user B according to the user A's actual movement at the site B using metadata of the moving path or the direction of the user A.

The outline of voice communication from the site A to the site B has been described above in connection with respective steps of the data collection process, the object decomposition process, and the object synthesis process, but of course, a similar process is performed in voice communication from the site B to the site A. Thus, two-way voice communication can be performed between the site A and the site B.

The outline of the acoustic system (information processing system) according to an embodiment of the present disclosure has been described above. Next, a configuration of the acoustic system according to the present embodiment will be described in detail with reference to FIGS. 2 to 5.

<2. Basic Configuration>

[2-1. System Configuration]

Figure 2:
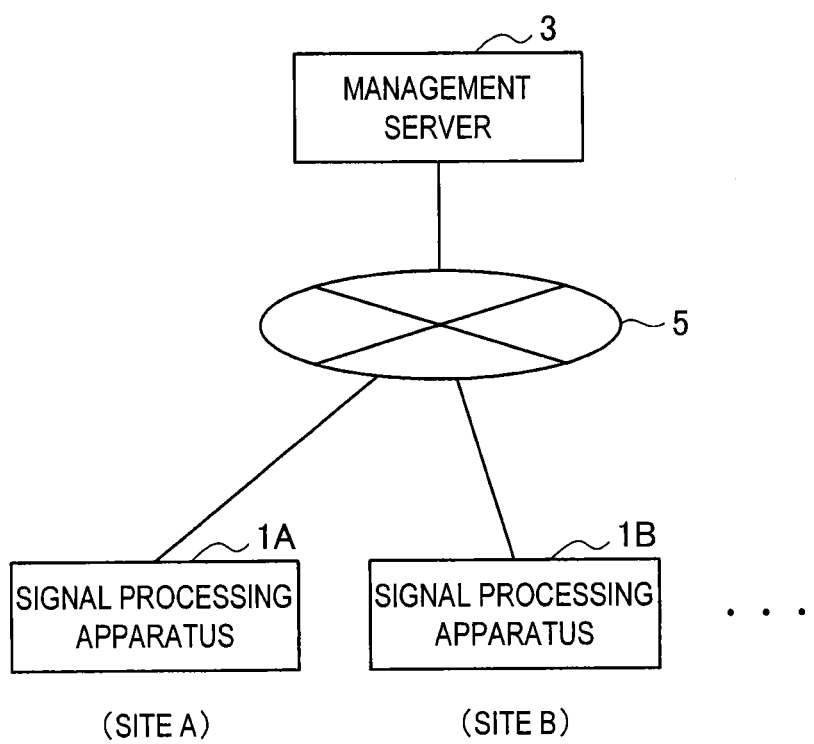
FIG. 2 is a diagram showing a system configuration of an acoustic system according to an embodiment of the present disclosure.

FIG. 2 is a diagram illustrating an overall configuration of the acoustic system according to the present embodiment. As shown in FIG. 2, the acoustic system includes a signal processing apparatus 1A, a signal processing apparatus 1B, and a management server 3.

The signal processing apparatus 1A and the signal processing apparatus 1B are connected to a network 5 in a wired/wireless manner, and can transmit or receive data to or from one another via the network 5. The management server 3 is connected to the network 5, and the signal processing apparatus 1A and the signal processing apparatus 1B can transmit or receive data to or from the management server 3.

The signal processing apparatus 1A processes signals input or output by the plurality of microphones 10A and the plurality of speakers 20A arranged at the site A. The signal processing apparatus 1B processes signals input or output by the plurality of microphones 10B and the plurality of speakers 20B arranged at the site B. Further, when it is unnecessary to distinguish the signal processing apparatuses 1A and 1B from one another, the signal processing apparatuses 1A and 1B are referred to collectively as a "signal processing apparatus 1."

The management server 3 has a function of performing a user authentication process and managing a user's absolute position (current position). Further, the management server 3 may also manage information (for example, IP address) representing a position of a place or a building.

Thus, the signal processing apparatus 1 can send a query for access destination information (for example, IP address) of a given target (person, place, building, or the like) designated by the user to the management server 3 and can acquire the access destination information.

[2-2. Signal Processing Apparatus]

Figure 3:
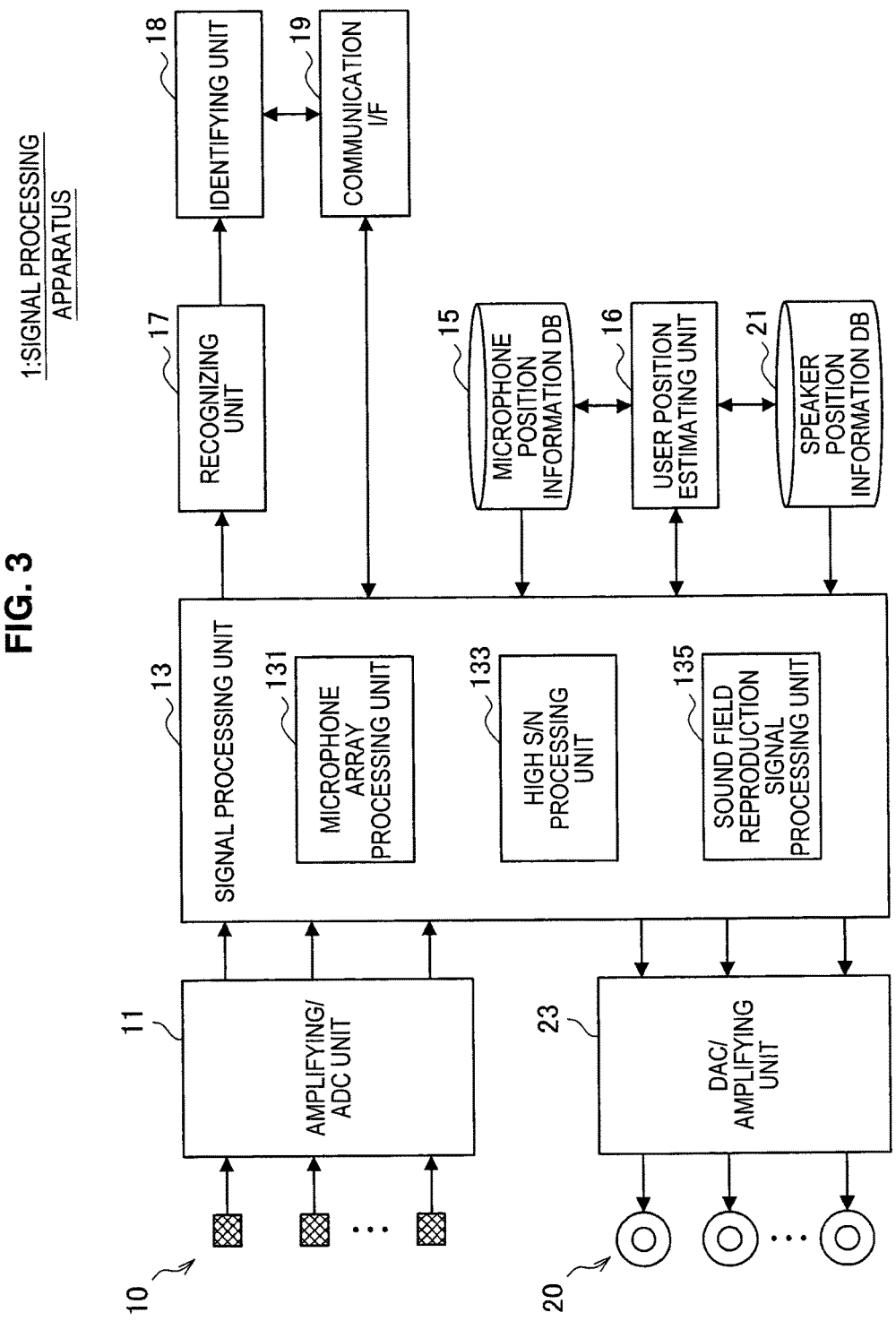
FIG. 3 is a block diagram showing a configuration of a signal processing apparatus according to the present embodiment.

Next, a configuration of the signal processing apparatus 1 according to the present embodiment will be described in detail. FIG. 3 is a block diagram showing a configuration of the signal processing apparatus 1 according to the present embodiment. As shown in FIG. 3, the signal processing apparatus 1 according to the present embodiment includes a plurality of microphones 10 (array microphone), an amplifying/analog-to-digital converter (ADC) unit 11, a signal processing unit 13, a microphone position information database (DB) 15, a user position estimating unit 16, a recognizing unit 17, an identifying unit 18, a communication interface (I/F) 19, a speaker position information DB 21, an amplifying/digital-to-analog converter (DAC) unit 23, and a plurality of speakers 20 (array speaker). The components will be described below.

(Array Microphone)

The plurality of microphones 10 are arranged throughout a certain area (site) as described above. For example, the plurality of microphones 10 are arranged at outdoor sites such as roads, electric poles, street lamps, houses, and outer walls of buildings and indoor sites such as floors, walls, and ceilings. The plurality of microphones 10 acquire ambient sounds, and output the acquired ambient sounds to the amplifying/ADC unit 11.

(Amplifying/ADC Unit)

The amplifying/ADC unit 11 has a function (amplifier) of amplifying acoustic waves output from the plurality of microphones 10 and a function (ADC) of converting an acoustic wave (analog data) into an audio signal (digital data). The amplifying/ADC unit 11 outputs the converted audio signals to the signal processing unit 13.

(Signal Processing Unit)

The signal processing unit 13 has a function of processing the audio signals acquired by the microphones 10 and transmitted through the amplifying/ADC unit 11 and the audio signals reproduced by the speakers 20 through the DAC/amplifying unit 23. Further, the signal processing unit 13 according to the present embodiment functions as a microphone array processing unit 131, a high S/N processing unit 133, and a sound field reproduction signal processing unit 135.

Microphone Array Processing Unit

The microphone array processing unit 131 performs directivity control such that the user's voice is focused on (a sound acquisition position is focused on the user's mouth) in the microphone array process for a plurality of audio signals output from the amplifying/ADC unit 11.

At this time, the microphone array processing unit 131 may select a microphone group forming the acoustically closed surface surrounding the user which is optimal for acquisition of the user's voice, on the basis of the user's position estimated by the user position estimating unit 16 or the positions of the microphones 10 registered to the microphone position information DB 15. Then, the microphone array processing unit 131 performs directivity control on the audio signals acquired by the selected microphone group. Further, the microphone array processing unit 131 may form super directivity of the array microphone through a delay-and-sum array process and a null generation process.

High S/N Processing Unit

The high S/N processing unit 133 has a function of processing a plurality of audio signals output from the amplifying/ADC unit 11 to form a monaural signal having high articulation and a high S/N ratio. Specifically, the high S/N processing unit 133 performs sound source separation, and performs dereverberation and noise reduction.

Further, the high S/N processing unit 133 may be disposed at a stage subsequent to the microphone array processing unit 131. Further, the audio signals (stream data) processed by the high S/N processing unit 133 are used for voice recognition performed by the recognizing unit 17 and are transmitted to an outside through a communication I/F 19.

Sound Field Reproduction Signal Processing Unit

The sound field reproduction signal processing unit 135 performs signal processing on the audio signals to be reproduced through the plurality of speakers 20, and performs control such that a sound field is localized around the user's position. Specifically, for example, the sound field reproduction signal processing unit 135 selects an optimal speaker group for forming the acoustically closed surface surrounding the user on the basis of the user's position estimated by the user position estimating unit 16 or the positions of the speakers 20 registered to the speaker position information DB 21. Then, the sound field reproduction signal processing unit 135 writes the audio signals which have been subjected to signal processing in output buffers of a plurality of channels corresponding to the selected speaker group.

Further, the sound field reproduction signal processing unit 135 controls an area inside the acoustically closed surface as an appropriate sound field. As a method of controlling the sound field, for example, the Helmholtz-Kirchhoff integral theorem and the Rayleigh integral theorem are known, and wave field synthesis (WFS) based on the theorems is generally known. Further, the sound field reproduction signal processing unit 135 may apply signal processing techniques disclosed in JP 4674505B and JP 4735108B.

Note that the shape of the acoustically closed surface formed by the microphones or the speakers is not particularly limited as long as it is a three-dimensional shape surrounding the user, and, as shown in FIG. 4, examples of the shape may include an acoustically closed surface 40-1 having an oval shape, an acoustically closed surface 40-2 having a columnar shape, and an acoustically closed surface 40-3 having a polygonal shape. The examples illustrated in FIG. 4 show as examples the shapes of the acoustically closed surfaces formed by a plurality of speakers 20B-1 to 20B-12 arranged around the user B in the site B. The examples also apply to the shapes of the acoustically closed surfaces formed by the plurality of microphones 10.

(Microphone Position Information DB)

The microphone position information DB 15 is a storage unit that stores position information of the plurality of microphones 10 arranged at the site. The position information of the plurality of microphones 10 may be registered in advance.

(User Position Estimating Unit)

The user position estimating unit 16 has a function of estimating the user's position. Specifically, the user position estimating unit 16 estimates the user's relative position to the plurality of microphones 10 or the plurality of speakers 20 on the basis of the analysis result of the sounds acquired by the plurality of microphones 10, the analysis result of the captured images obtained by the image sensors, or the detection result obtained by the human sensors. The user position estimating unit 16 may acquire Global Positioning System (GPS) information and may estimate the user's absolute position (current position information).

(Recognizing Unit)

The recognizing unit 17 analyzes the user's voice on the basis of the audio signals which are acquired by the plurality of microphones 10 and then processed by the signal processing unit 13, and recognizes a command. For example, the recognizing unit 17 performs morphological analysis on the voice of the user "I'd like to speak with B," and recognizes a call origination request command on the basis of the given target "B" that is designated by the user and the request "I'd like to speak with."

(Identifying Unit)

The identifying unit 18 has a function of identifying the given target recognized by the recognizing unit 17. Specifically, for example, the identifying unit 18 may decide the access destination information for acquiring a voice and an image corresponding to the given target. For example, the identifying unit 18 may transmit information representing the given target to the management server 3 through the communication I/F 19, and acquire the access destination information (for example, IP address) corresponding to the given target from the management server 3.

(Communication I/F)

The communication I/F 19 is a communication module for transmitting or receiving data to or from another signal processing apparatus or the management server 3 via the network 5. For example, the communication I/F 19 according to the present embodiment sends a query for access destination information corresponding to the given target to the management server 3, and transmits the audio signal which is acquired by the microphone 10 and then processed by the signal processing unit 13 to another signal processing apparatus which is an access destination.

(Speaker Position Information DB)

The speaker position information DB 21 is a storage unit that stores position information of the plurality of speakers 20 arranged at the site. The position information of the plurality of speakers 20 may be registered in advance.

(DAC/Amplifying Unit)

The DAC/amplifying unit 23 has a function (DAC) of converting the audio signals (digital data), which are written in the output buffers of the channels, to be respectively reproduced through the plurality of speakers 20 into acoustic waves (analog data).

In addition, the DAC/amplifying unit 23 amplifies the converted acoustic waves, and reproduces (outputs) the acoustic waves through the plurality of speakers 20.

(Array Speaker)

The plurality of speakers 20 are arranged throughout a certain area (site) as described above. For example, the plurality of speakers 20 are arranged at outdoor sites such as roads, electric poles, street lamps, houses, and outer walls of buildings and indoor sites such as floors, walls, and ceilings. Further, the plurality of speakers 20 reproduce the acoustic waves (voices) output from the DAC/amplifying unit 23.

Heretofore, the configuration of the signal processing apparatus 1 according to the present embodiment has been described in detail. Next, with reference to FIG. 5, the configuration of the management server 3 according to the present embodiment will be described.

[2-3. Management Server]

Figure 5:
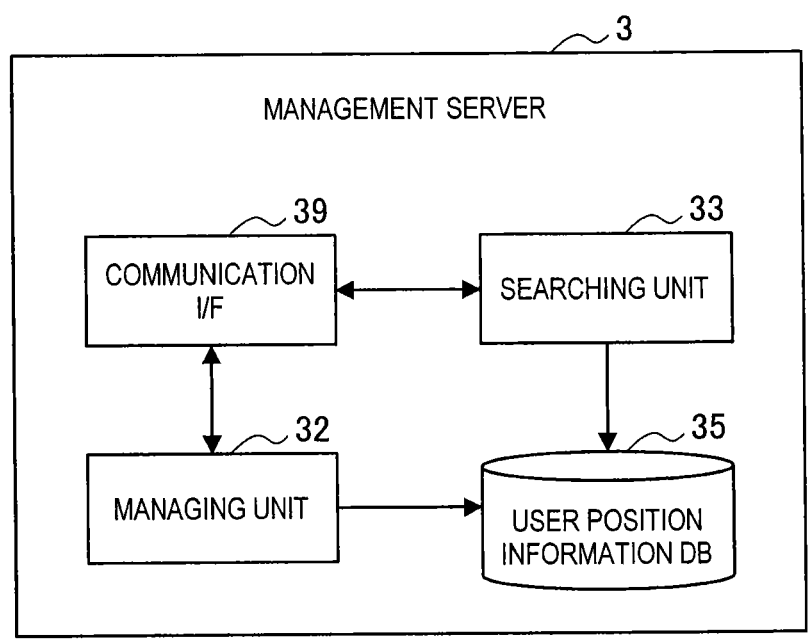
FIG. 5 is a block diagram showing a configuration of a management server according to the present embodiment.

FIG. 5 is a block diagram showing a configuration of the management server 3 according to the present embodiment. As shown in FIG. 5, the management server 3 includes a managing unit 32, a searching unit 33, a user position information DB 35, and a communication I/F 39. The above-mentioned components will be described below.

(Managing Unit)

The managing unit 32 manages information associated with a place (site) at which the user is currently located on the basis of a user identification (ID) transmitted from the signal processing apparatus 1. For example, the managing unit 32 identifies the user on the basis of the user ID, and stores an IP address of the signal processing apparatus 1 of a transmission source in the user position information DB 35 in association with a name of the identified user or the like as the access destination information. The user ID may include a name, a personal identification number, or biological information. Further, the managing unit 32 may perform the user authentication process on the basis of the transmitted user ID.

(User Position Information DB)

The user position information DB 35 is a storage unit that stores information associated with a place at which the user is currently located according to management by the managing unit 32. Specifically, the user position information DB 35 stores the user ID and the access destination information (for example, an IP address of a signal processing apparatus corresponding to a site at which the user is located) in association with each other. Further, current position information of each user may be constantly updated.

(Searching Unit)

The searching unit 33 searches for the access destination information with reference to the user position information DB 35 according to the access destination (call origination destination) query from the signal processing apparatus 1. Specifically, the searching unit 33 searches for the associated access destination information and extracts the access destination information from the user position information DB 35 on the basis of, for example, a name of a target user included in the access destination query.

(Communication I/F)

The communication I/F 39 is a communication module that transmits or receives data to or from the signal processing apparatus 1 via the network 5. For example, the communication I/F 39 according to the present embodiment receives the user ID and the access destination query from the signal processing apparatus 1. Further, the communication I/F 39 transmits the access destination information of the target user in response to the access destination query.

Heretofore, the components of the acoustic system according to an embodiment of the present disclosure have been described in detail. Next, with reference to FIGS. 6 to 9, an operation process of the acoustic system according to the present embodiment will be described in detail.

<3. Operation Process>

[3-1. Basic Process]

Figure 6:
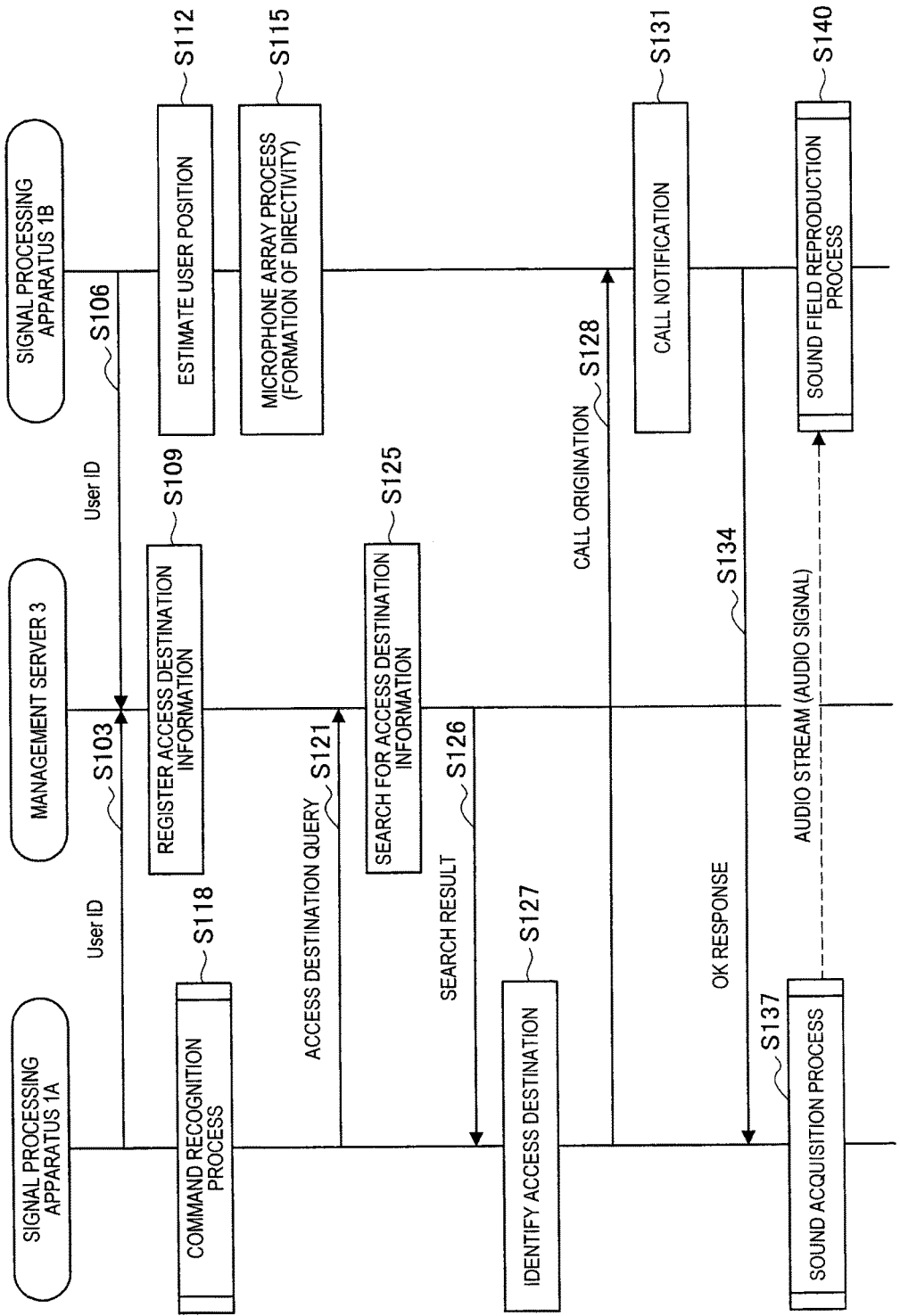
FIG. 6 is a flowchart showing a basic process of the acoustic system according to the present embodiment.

FIG. 6 is a flowchart showing a basic process of the acoustic system according to the present embodiment. As shown in FIG. 6, first of all, in step S103, the signal processing apparatus 1A transmits an ID of the user A located at the site A to the management server 3. The signal processing apparatus 1A may acquire an ID of the user A from a tag such as a radio frequency identification (RFID) tag possessed by the user A or from the user A's voice. Further, the signal processing apparatus 1A may read biological information from the user A (a face, an eye, a hand, or the like), and acquire the biological information as an ID.

Meanwhile, in step S106, the signal processing apparatus 1B similarly transmits an ID of the user B located at the site B to the management server 3.

Next, in step S109, the management server 3 identifies the user on the basis of the user ID transmitted from each signal processing apparatus 1, and registers, for example, an IP address of the signal processing apparatus 1 of the transmission source as the access destination information in association with, for example, the identified user's name.

Next, in step S112, the signal processing apparatus 1B estimates the position of the user B located at the site B. Specifically, the signal processing apparatus 1B estimates the user B's relative position to the plurality of microphones arranged at the site B.

Next, in step S115, the signal processing apparatus 1B performs the microphone array process on the audio signals acquired by the plurality of microphones arranged at the site B on the basis of the user B's estimated relative position so that the sound acquisition position is focused on the user B's mouth. As described above, the signal processing apparatus 1B prepares for the user B to utter something.

On the other hand, in step S118, the signal processing apparatus 1A similarly performs the microphone array process on the audio signals acquired by the plurality of microphones arranged at the site A so that the sound acquisition position is focused on the user A's mouth, and prepares for the user A to utter something. Then, the signal processing apparatus 1A recognizes a command on the basis of the user A's voice (utterance). Here, the description will continue with an example in which the user A utters "I'd like to speak with B," and the signal processing apparatus 1A recognizes the utterance as a command of the "call origination request to the user B." A command recognition process according to the present embodiment will be described in detail in [3-2. Command recognition process] which will be described later.

Next, in step S121, the signal processing apparatus 1A sends the access destination query to the management server 3. When the command is the "call origination request to the user B" as described above, the signal processing apparatus 1A queries the access destination information of the user B.

Next, in step S125, the management server 3 searches for the access destination information of the user B in response to the access destination query from the signal processing apparatus 1A, and then, in step S126 that follows, transmits the search result to the signal processing apparatus 1A.

Next, in step S127, the signal processing apparatus 1A identifies (determines) an access destination on the basis of the access destination information of the user B received from the management server 3.

Next, in step S128, the signal processing apparatus 1A performs the process of originating a call to the signal processing apparatus 1B on the basis of the access destination information of the identified user B, for example, an IP address of the signal processing apparatus 1B corresponding to the site B at which the user B is currently located.

Next, in step S131, the signal processing apparatus 1B outputs a message asking the user B whether to answer a call from the user A or not (call notification). Specifically, for example, the signal processing apparatus 1B may reproduce a corresponding message through the speakers arranged around the user B. Further, the signal processing apparatus 1B recognizes the user B's response to the call notification on the basis of the user B's voice acquired through the plurality of microphones arranged around the user B.

Next, in step S134, the signal processing apparatus 1B transmits the response of the user B to the signal processing apparatus 1A. Here, the user B gives an OK response, and thus, two-way communication starts between the user A (signal processing apparatus 1A side) and the user B (signal processing apparatus 1B side).

Specifically, in step S137, in order to start communication with the signal processing apparatus 1B, the signal processing apparatus 1A performs a sound acquisition process of acquiring the user A's voice at the site A and transmitting an audio stream (audio signals) to the site B (signal processing apparatus 1B side). The sound acquisition process according to the present embodiment will be described in detail in [3-3. Sound acquisition process] which will be described later.

Then, in step S140, the signal processing apparatus 1B forms the acoustically closed surface surrounding the user B through the plurality of speakers arranged around the user B, and performs a sound field reproduction process on the basis of the audio stream transmitted from the signal processing apparatus 1A. Note that the sound field reproduction process according to the present embodiment can further construct a sound field of a third space (site C), and can provide the user speaking on the telephone with another user located at another space with a feeling of being absorbed in the third space. The sound field reproduction process will be described in detail in "4. Construction of sound field of third space" which will be described later.

In steps S137 to S140 described above, one-way communication has been described as an example, but in the present embodiment, two-way communication can be performed. Accordingly, unlike steps S137 to S140 described above, the signal processing apparatus 1B may perform the sound acquisition process, and the signal processing apparatus 1A may perform the sound field reproduction process.

Heretofore, the basic process of the acoustic system according to the present embodiment has been described. Through the above-described process, the user A can speak on the telephone with the user B located at a different place by uttering "I'd like to speak with B" without carrying a mobile phone terminal, a smart phone, or the like, by using the plurality of microphones and the plurality of speakers arranged around the user A. Next, the command recognition process performed in step S118 will be described in detail with reference to FIG. 7.

[3-2. Command Recognition Process]

Figure 7:
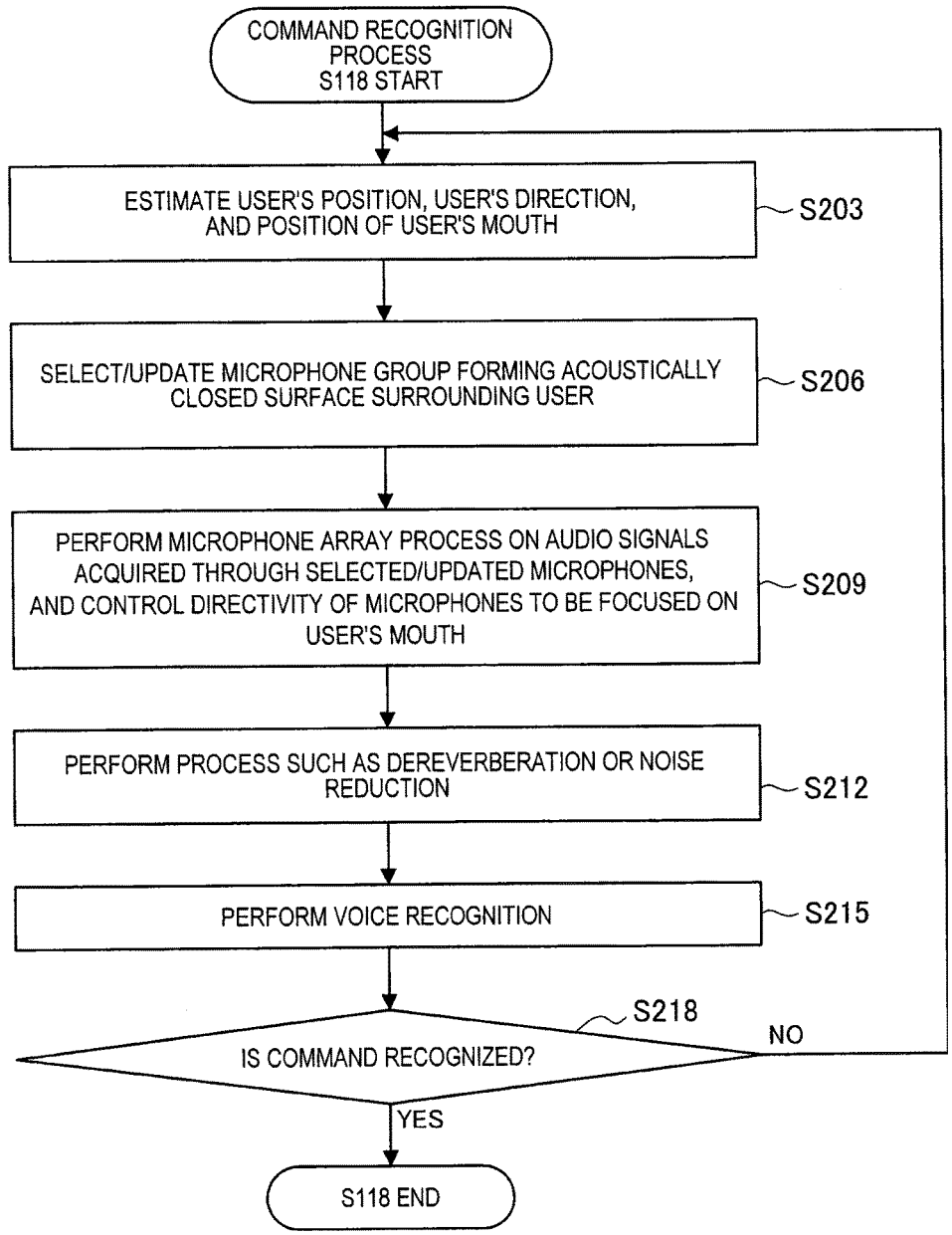
FIG. 7 is a flowchart showing a command recognition process according to the present embodiment.

FIG. 7 is a flowchart showing the command recognition process according to the present embodiment. As shown in FIG. 7, first of all, in step S203, the user position estimating unit 16 of the signal processing apparatus 1 estimates the user's position. For example, the user position estimating unit 16 may estimate the relative position and direction of the user to each microphone, and the position of the user's mouth on the basis of sounds acquired through the plurality of microphones 10, captured images obtained by the image sensors, an arrangement of the microphones stored in the microphone position information DB 15, or the like.

Next, in step S206, the signal processing unit 13 selects the microphone group forming the acoustically closed surface surrounding the user according to the user's relative position and direction, and the position of the user's mouth that have been estimated.

Next, in step S209, the microphone array processing unit 131 of the signal processing unit 13 performs the microphone array process on the audio signals acquired through the selected microphone group, and controls directivity of the microphones to be focused on the user's mouth. Through this process, the signal processing apparatus 1 can prepare for the user to utter something.

Next, in step S212, the high S/N processing unit 133 performs a process such as dereverberation or noise reduction on the audio signal processed by the microphone array processing unit 131 to improve the S/N ratio.

Next, in step S215, the recognizing unit 17 performs voice recognition (voice analysis) on the basis of the audio signal output from the high S/N processing unit 133.

Then, in step S218, the recognizing unit 17 performs the command recognition process on the basis of the recognized voice (audio signal). There is no particular restriction to concrete content of the command recognition process, but for example, the recognizing unit 17 may recognize a command by comparing a previously registered (learned) request pattern with the recognized voice.

When a command is not recognized in step S218 (No in S218), the signal processing apparatus 1 repeatedly performs the process performed in steps S203 to S215. At this time, since steps S203 and S206 are also repeated, the signal processing unit 13 can update the microphone group forming the acoustically closed surface surrounding the user according to the user's movement.

[3-3. Sound Acquisition Process]

Figure 8:
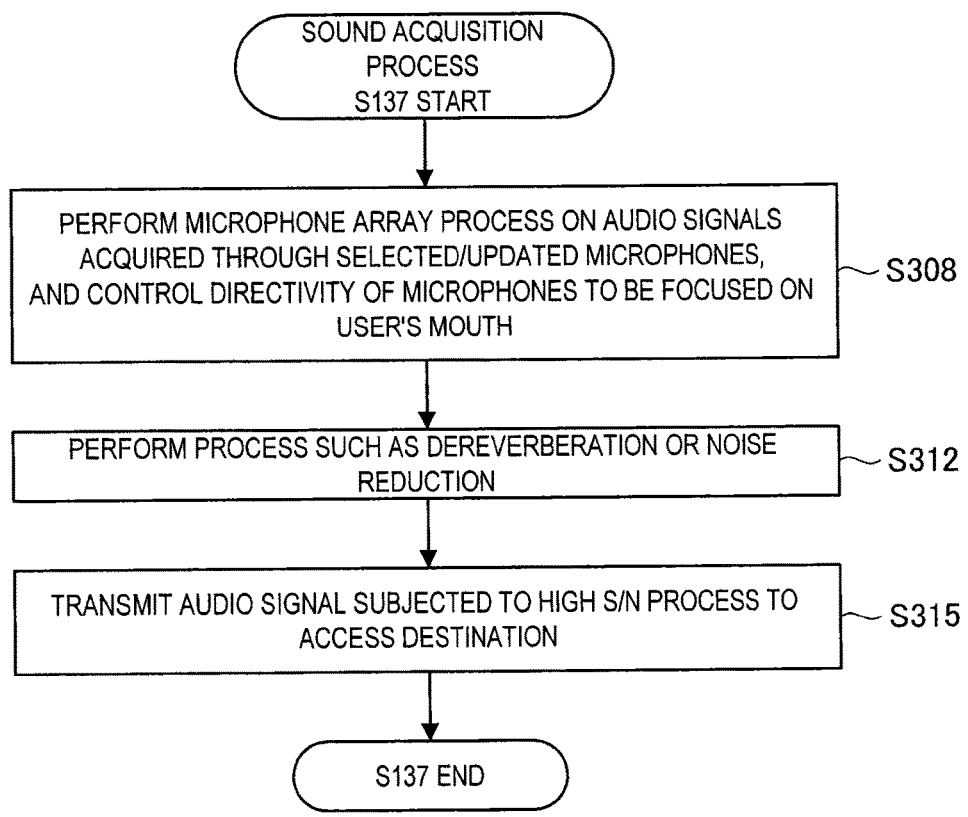
FIG. 8 is a flowchart showing a sound acquisition process according to the present embodiment.

Next, the sound acquisition process performed in step S137 of FIG. 6 will be described in detail with reference to FIG. 8. FIG. 8 is a flowchart showing the sound acquisition process according to the present embodiment. As shown in FIG. 8, first of all, in step S308, the microphone array processing unit 131 of the signal processing unit 13 performs the microphone array process on the audio signals acquired through the selected/updated microphones, and controls directivity of the microphones to be focused on the user's mouth.

Next, in step S312, the high S/N processing unit 133 performs the process such as dereverberation or noise reduction on the audio signal processed by the microphone array processing unit 131 to improve the S/N ratio.

Then, in step S315, the communication I/F 19 transmits the audio signal output from the high S/N processing unit 133 to the access destination (for example, signal processing apparatus 1B) represented by the access destination information of the target user identified in step S126 (see FIG. 6). Through this process, a voice uttered by the user A at the site A is acquired by the plurality of microphones arranged around the user A and then transmitted to the site B.

Heretofore, the command recognition process and the sound acquisition process according to the present embodiment have been described. Next, the sound field reproduction process according to the present embodiment will be described in detail.

<4. Construction of Sound Field of Third Space>

As described above, the sound field reproduction process (step S140 in FIG. 6) according to the present embodiment can construct a sound field of a third space (site C), and can provide the user speaking on the telephone with another user located at another space with a feeling of being absorbed in the third space. Hereinafter, with reference to FIG. 9, an outline of sound field construction for providing the user with the feeling of being absorbed in the third space will be described.

Figure 9:
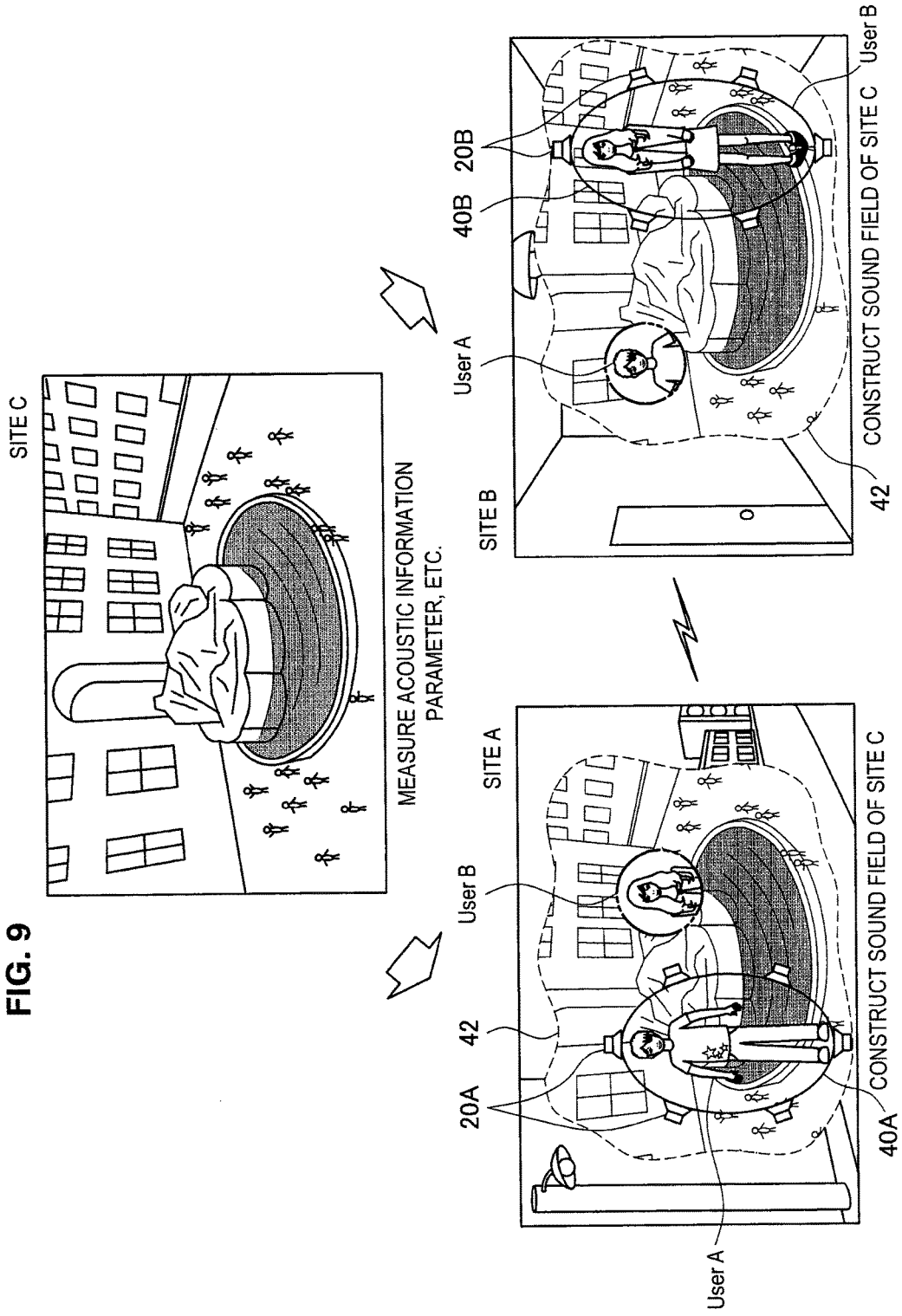
FIG. 9 is a diagram illustrating construction of a sound field of a third space according to the present embodiment.

FIG. 9 is a diagram illustrating construction of the sound field of the third space according to the present embodiment. As shown in FIG. 9, in the case where the user A located at the site A speaks on the telephone with the user B located at the site B, the acoustic system according to the present embodiment constructs a sound field 42 of the site C which is the third space in each of the sites A and B. Here, as an example, let us assume that the site A, the site B, and the site C are located away from one another (remote places). In this case, for example, the user B who is in Tokyo (site B) can speak on the telephone with the user A who is in the USA (site A) while being provided with the feeling of being absorbed in the space of Italy (site C) which is a place where the user B is to travel with the user A.

Specifically, the acoustic system according to the present embodiment may construct the sound field 42 of the site C using an acoustic information parameter (characteristics of a parameter such as an impulse response) measured in the site C in advance or acoustic content (environmental sound) acquired in the site C. Note that the acoustic information parameter and the acoustic content of the third space may be acquired in the third space in advance and may be accumulated in a management server.

(Technique of Constructing Sound Field of Site C)

Figure 10:
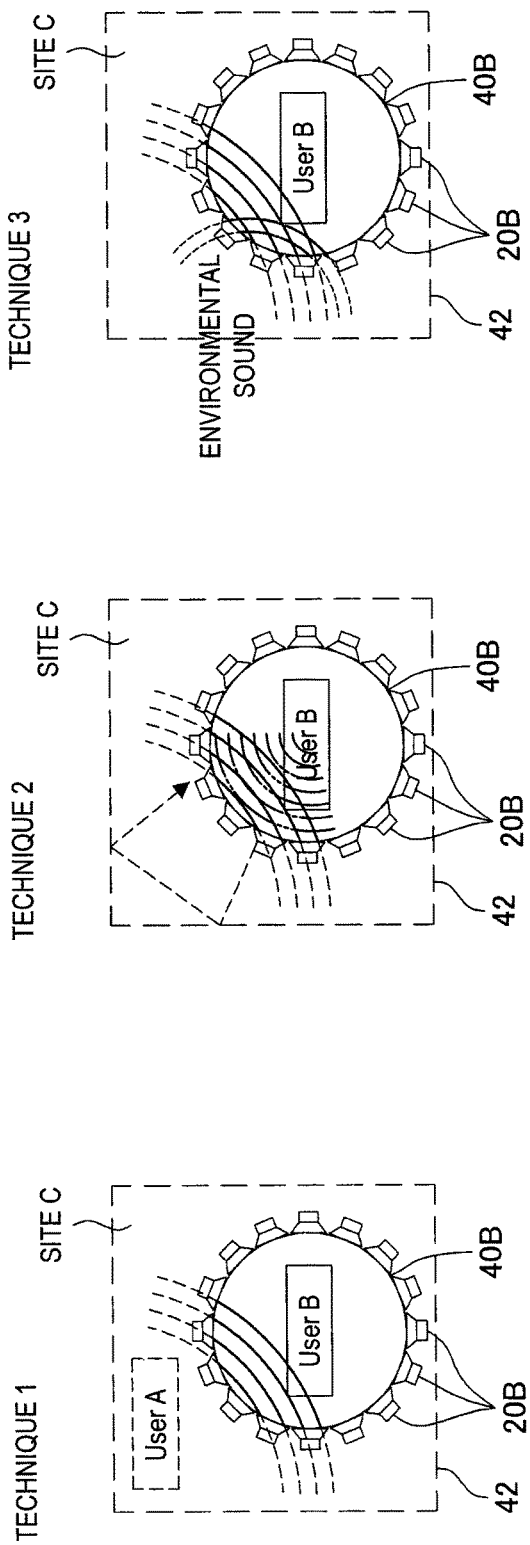
FIG. 10 is a diagram illustrating techniques of constructing a sound field of a site C.

Here, with reference to FIG. 10, there will be described techniques of constructing the sound field of the site C in the respective sites A and B in the case where the user A located at the site A speaks on the telephone with the user B located at the site B. FIG. 10 is a diagram illustrating techniques of constructing the sound field of the site C. In the example shown in FIG. 10, there will be described the case where, in the site B at which the user B who is speaking on the telephone with the user A is located, the sound field of the site C is constructed (the feeling of being absorbed in the site C is provided).

As shown in FIG. 10, a technique 1 is as follows: an audio image is localized so that the voice of the user A is present outside an acoustically closed surface 40B formed by the plurality of speakers 20B surrounding the user B, and is further modified using an acoustic information parameter in a manner that the voice of the user A can be heard as if the voice were echoed in the site C.

Here, as shown in FIG. 10, in the case where the audio image of the user A is localized outside the acoustically closed surface 40, a wave front at the time at which the voice emitted by the user A located outside the acoustically closed surface 40B crosses the acoustically closed surface 40B is estimated. Then, the reproduction from the plurality of speakers 20 is performed in a manner that the estimated wave front is created inside the acoustically closed surface 40B, to thereby localize the audio image.

Further, in the case of estimating that the user A emits a voice in the site C, there may be a case where the voice of the user A may reach the acoustically closed surface 40B with the inclusion of a reflected sound (reflected sound differing depending on materials and structures) owing to a construction or an obstacle of the site C. Accordingly, the acoustic system according to the present embodiment constructs, in the site B, the sound field 42 in which the voice of the user A can be heard as if the voice were echoed in the site C, by modifying the voice of the user A using the acoustic information parameter (impulse response) that has been measured in the site C in advance. In this way, the user B can be provided with the feeling of being absorbed in the site C further affluently.

A technique 2 is as follows: the voice of the user B located inside the acoustically closed surface 40 is acquired, the voice is modified using the acoustic information parameter of the site C, and the processed voice is reproduced from the plurality of speakers 20B forming the acoustically closed surface 40. That is, in order that the user B located inside the acoustically closed surface 40 feels the sound field of the site C as if the user B were actually feeling the sound field, is provided with the feeling of being absorbed in the site C further affluently, and feels a large size of the space of the site C, it is also important to feel the change in the voice that the user B himself/herself has emitted (echolocation) in addition to the modification (technique 1) of the voice of the partner with whom the user B speaks on the telephone. Accordingly, in the technique 2, the sound field 42 is constructed in the site B in a manner that the voice that the user B has emitted can be heard as if the voice were echoed in the site C. In this way, the user B can further affluently experience the ambience of the site C and the feeling of being absorbed in the site C. Note that a specific method for achieving the technique 2 will be described later with reference to FIG. 16A and FIG. 16B.

A technique 3 is as follows: by reproducing acoustic content such as murmuring voices in the site C and an environmental sound from the plurality of speakers 20B forming the acoustically closed surface 40 surrounding the user B, the ambience of the site C and the feeling of being absorbed in the site C are increased. The acoustic content of the site C may be recorded in advance or may be acquired in real time.

Heretofore, there have been described with reference to FIG. 10 three techniques for constructing the sound field for providing the feeling of being absorbed in the site C. In the acoustic system according to the present embodiment, the sound field may be constructed using one technique out of the three techniques, or the sound field may be constructed using two or more techniques in combination.

(Designation of Site C)

Further, in the present embodiment, the third space (site C) may be appropriately designated by the user or may be the place which is set in advance. For example, when the user A located at the site A utters "I'd like to speak with the user B (first target) at the site C (second target)," the plurality of microphones 10A (see FIG. 1) arranged around the user A acquires the utterance, and the utterance is recognized as a command by the signal processing apparatus 1A.

Next, the signal processing apparatus 1A sends a request for access destination information for speaking with the "user B" on the telephone and data for constructing the sound field of the designated place to the management server. Then, the management server transmits the access destination information (here, an IP address or the like of the signal processing apparatus 1B of the site B at which the user B is located) and the data for constructing the sound field (here, the acoustic information parameter and the acoustic content of the site C) to the signal processing apparatus 1A.

Further, in the case where communication between the signal processing apparatus 1A and the signal processing apparatus 1B is started (in the case where the user B gives an OK response to the call origination from the user A), the data for constructing the sound field is also transmitted to the signal processing apparatus 1B. In this way, the sound field of the site C is constructed in the site A and the site B, and the user A and the user B located at the different sites can share the feeling of being absorbed in the same place.

Heretofore, the outline of sound field construction for providing the user with the feeling of being absorbed in the third space has been described. Subsequently, with reference to FIG. 11, a configuration of the management server which accumulates the acoustic information parameter and the acoustic content of the third space will be described.

[4-1. Configuration of Management Server]

Figure 11:
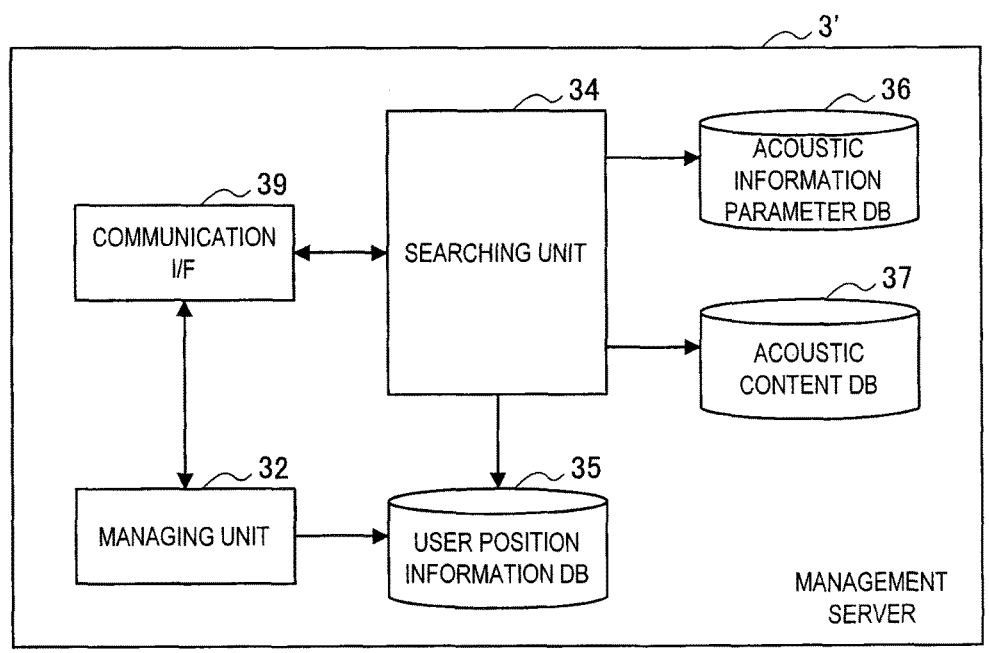
FIG. 11 is a block diagram showing another configuration of the management server according to the present embodiment.

FIG. 11 is a block diagram showing another configuration of the management server according to the present embodiment. As shown in FIG. 11, a management server 3' includes a managing unit 32, a searching unit 34, a user position information DB 35, a communication I/F 39, an acoustic information parameter DB 36, and an acoustic content DB 37. Since the managing unit 32, the user position information DB 35, and the communication I/F 39 are the same as those described with reference to FIG. 5, the description thereof will be omitted here.

(Searching Unit)

First, the searching unit 34 searches for, in the same manner as the searching unit 33 described above, the access destination information with reference to the user position information DB 35 according to the access destination (call origination destination) query from the signal processing apparatus 1. Specifically, the searching unit 33 searches for the associated access destination information and extracts the access destination information from the user position information DB 35 on the basis of, for example, a name of a target user included in the access destination query.

Further, in response to a request for the data for constructing the sound field from the signal processing apparatus 1, the searching unit 34 searches for the acoustic information parameter of the designated site and extracts the acoustic information parameter from the acoustic information parameter DB 36. In addition, in response to the request for the data for constructing the sound field from the signal processing apparatus 1, the searching unit 34 searches for the acoustic content of the designated site and extracts the acoustic content from the acoustic content DB 37.

(Acoustic Information Parameter)

The acoustic information parameter DB 36 is a storage unit which stores acoustic information parameters that have been measured in the respective sites in advance. The acoustic parameter may be obtained by measuring an impulse response from any one point or a plurality of points (position(s)) at which audio image(s) is(/are) attempted to be localized) in each site. Further, the S/N ratio improves by using the time streched pulse (TSP) response, the swept-sine method, the M-sequence response, and the like in measuring the impulse response.

Here, with reference to FIG. 12, the measurement of the acoustic information parameter will be described. A measurement 1 shown in FIG. 12 describes the measurement of the acoustic information parameter (first acoustic information parameter) which is used when modifying the voice of the speaking partner localized at any position outside the acoustically closed surface 40 in the technique 1 described with reference to FIG. 10. As shown in FIG. 12, a plurality of microphones 10C each having directivity turning outward arranged at the site C measure how the transmission is performed (impulse response) from a sound source (speaker 20C) to each microphones 10C, the speaker 20C being installed at any position outside the closed surface 43 formed by the plurality of microphones 10C.

In the example shown in FIG. 12, although one speaker 20C is disposed in the measurement 1, the example is not limited thereto, and a plurality of speakers 20C may be arranged outside the closed surface 43 and the transmission from each of the speakers 20 to each of the microphones 10C may be measured. In this way, the number of locations at which the sound sources of the user A can be localized can be increased in the technique 1.

Further, a measurement 2 shown in FIG. 12 describes the measurement of the acoustic information parameter (second acoustic information parameter) which is used when modifying the voice of the user himself/herself located inside the acoustically closed surface 40 in the technique 2 described with reference to FIG. 10. As shown in FIG. 12, a plurality of microphones 10C each having directivity turning outward arranged at the site C measure how the sound (signal for measurement) output from the sound source (speaker 20C) is transmitted to each microphones 10C with the influence of reflection/echo in the site C, the speaker 20C being installed inside the closed surface 43 formed by the plurality of microphones 10C. In the example shown in FIG. 12, although one speaker 20C is disposed in the measurement 2 as an example, the present embodiment is not limited thereto, and a plurality of speakers 20C may be arranged inside the closed surface 43 and the transmission from each of the speakers 20 to each of the microphones 10C may be measured.

(Acoustic Content)

The acoustic content DB 37 is a storage unit which stores acoustic content acquired from each site. Examples of the acoustic content include ambient sounds (environmental sounds, murmuring voices, and the like) that have been recorded (measured) in each site.

The measurement of the acoustic content is performed as shown in a measurement 3 of FIG. 12, for example, a plurality of microphones 10C each having directivity turning outward arranged at the site C measure (record) ambient sounds. The measurement of the ambient sounds may be performed for each hour, weekday, and holiday. In this way, the acoustic system according to the present embodiment can construct a sound field of the site C for each hour, weekday, and holiday. For example, the acoustic content close to the current hour can be reproduced at the site B which is the reproduction environment.

Figure 13:
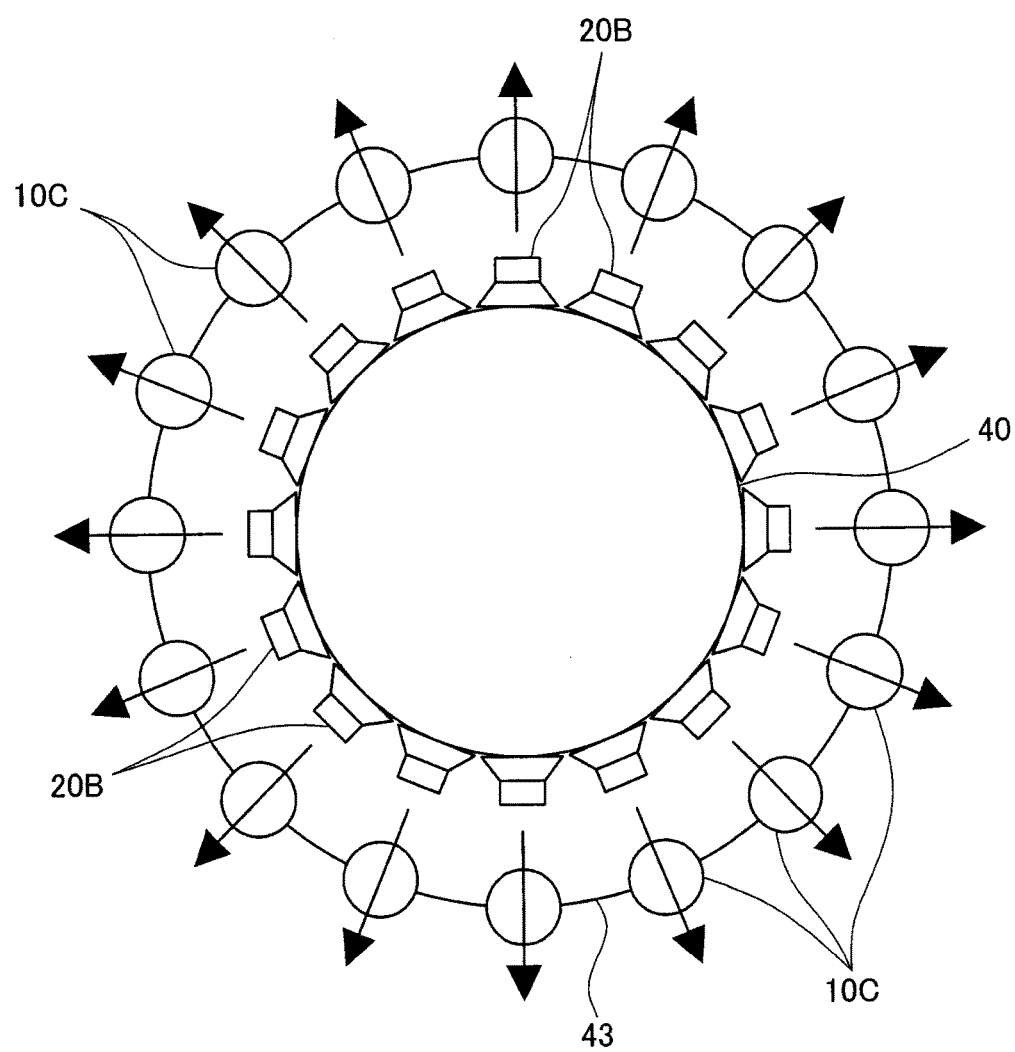
FIG. 13 is a diagram showing an arrangement of a plurality of microphones in a measuring environment and an arrangement of a plurality of speakers in a listening environment in comparison with each other.

Note that the size of the closed surface 43 formed by the plurality of microphones 10C shown in FIG. 12 may be larger than the acoustically closed surface of the listening environment (reproduction environment). Hereinafter, description will be given with reference to FIG. 13. FIG. 13 is a diagram showing an arrangement of the plurality of microphones 10C in a measuring environment (site C here) and an arrangement of the plurality of speakers 20B in a listening environment (site B here) in comparison with each other.

As shown in FIG. 13, with respect to the acoustically closed surface 40 formed by the plurality of speakers 20B provided so as to surround the user B, the plurality of microphones 10C used for the measurement at the site C are arranged so as to form the closed surface 43, the size of which is larger than the size of the acoustically closed surface 40.

Further, as described above with reference to FIG. 4, at the site B of the listening environment (reproduction environment), the three-dimensional acoustically closed surfaces 40-1, 40-2, and 40-3 are each formed with the plurality of speakers 20B-1 to 20B-12. Accordingly, as shown in FIG. 14, also at the site C which is the measuring environment, a plurality of microphones 10C-1 to 10C-12 each having directivity turning outward may form three dimensional closed surfaces 43-1, 43-2, and 40-3.

Heretofore, each component of the configuration of the management server 3' according to the present embodiment has been described in detail. Subsequently, there will be described control performed on the site B side of the listening environment (reproduction environment) constructing the sound field of the site C using the techniques 1 to 3 (see FIG. 12). At the site B side, an optimal sound field is formed by the sound field reproduction signal processing unit 135 (see FIG. 3) of the signal processing apparatus 1B. Hereinafter, with reference to FIG. 15, there will be described specifically the configuration of the sound field reproduction signal processing unit 135 that constructs the sound field by achieving the techniques 1 to 3.

[4-2. Configuration of Sound Field Reproduction Signal Processing Unit]

Figure 15:
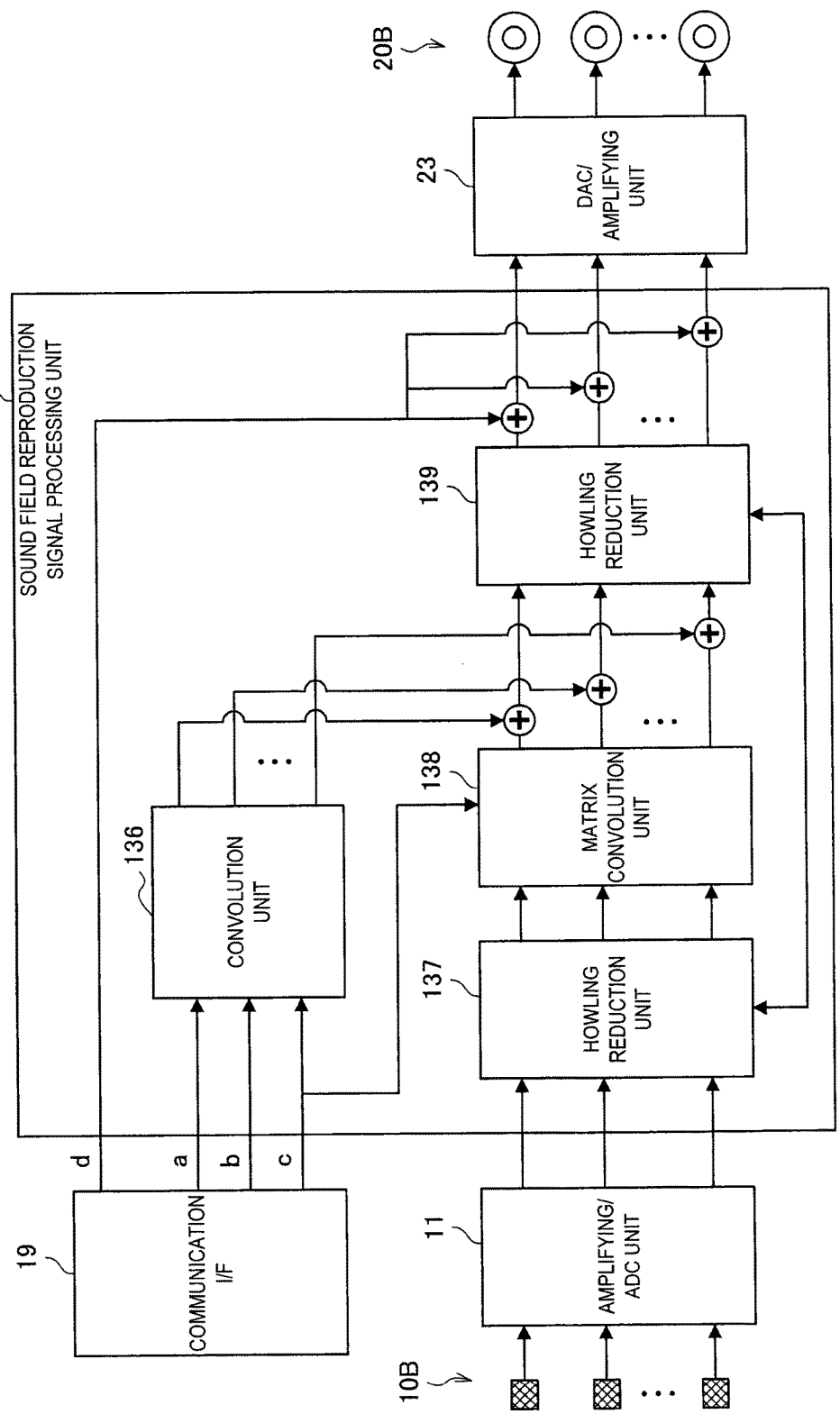
FIG. 15 is a block diagram showing a configuration of a sound field reproduction signal processing unit performing sound field construction for providing a feeling of being absorbed in the site C.

FIG. 15 is a block diagram illustrating a configuration of the sound field reproduction signal processing unit 135 performing sound field construction for providing a feeling of being absorbed in the site C. Further, FIG. 15 shows main components of the signal processing apparatus 1B that are related to the description here, and the other components are omitted.

As shown in FIG. 15, the sound field reproduction signal processing unit 135 functions as a convolution unit 136, howling reduction units 137 and 139, and a matrix convolution unit 138.

(Convolution Unit)

The convolution unit 136 has a function of achieving the above-mentioned technique 1 (localization of the audio image of the user A, modification of the echoed voice of the user A). Specifically, through the communication I/F 19, the convolution unit 136 performs rendering on an audio signal b (voice of the user A) acquired (received) from the signal processing apparatus 1A of the site A for each output speaker, using an acoustic information parameter c (first acoustic information parameter) of the site C. Further, in this case, taking into consideration a parameter a of the position at which the audio image of the user A is localized, the convolution unit 136 may use an acoustic information parameter c (impulse response) of the site C corresponding to the localization position. Note that the parameter a of the position at which the audio image of the user A is localized may be transmitted from the signal processing apparatus 1A or the management server 3' through the communication I/F 19, or may be calculated by the signal processing apparatus 1B on the basis of the instruction given by the user B. Further, the convolution unit 136 may acquire the acoustic information parameter c (impulse response) of the site C from the management server 3' through the communication I/F 19.

Then, as shown in FIG. 15, the convolution unit 136 writes the audio signal subjected to the signal process to the output buffer of each of the output speakers (plurality of speakers 20B forming the acoustically closed surface 40B surrounding the user B).

(Howling Reduction Units)

The howling reduction units 137 and 139 are provided as necessary in order to avoid howling caused by feedback, at the latter part of the amplifying/ADC unit 11 of the microphones and the former part of the DAC/amplifying unit 23 of the speakers as shown in FIG. 15, respectively, and are capable of operating in cooperation. As described above, in the technique 2, rendering is performed on the sound acquired from the plurality of microphones 10B arranged around the user B using the acoustic information parameter (impulse response), and the sound is reproduced from the plurality of speakers 20B arranged around the user B. In this case, since the positions of the microphones are close to the positions of the speakers, there is a risk that excessive oscillation may occur due to operations of the microphones and the speakers. Accordingly, in the example shown in FIG. 15, the howling reduction units 137 and 139 are provided and the howling reduction process is executed. Note that, in order to prevent the excessive oscillation, the sound field reproduction signal processing unit 135 may also include an echo canceler in addition to the howling reduction units 137 and 139.

(Matrix Convolution Unit)

The matrix convolution unit 138 has a function of achieving the above-mentioned technique 2 (modification of echoed voice of the user B). Specifically, the matrix convolution unit 138 performs rendering on an audio signal (sound generated in the acoustically closed surface 40B) acquired by the plurality of microphones 10B arranged at the site B for each output speaker, using an acoustic information parameter c (second acoustic information parameter; impulse response group) of the site C. In this way, the audio signal for constructing, at the site B, the sound field in which the sound generated in the acoustically closed surface 40B at the site B such as the voice of the user B himself/herself is felt to be echoed at the site C.

Here, with reference to FIG. 16A and FIG. 16B, the way of achieving the technique 2 according to the present embodiment will be described specifically. FIG. 16A is a diagram illustrating measurement of an impulse response in the site C. As shown in FIG. 16A, first, an impulse response from each of the speakers 20C to each of the microphones 10C is measured, the speakers 20C being arranged at the site C and facing outside of the closed surface 43, the microphones 10C being also arranged at the site C and facing outside of the closed surface 43.

Specifically, an impulse response from a single speaker on the closed surface 43 to a group including a plurality of microphones on the same closed surface 43 is measured. From the viewpoint of the frequency axis, the impulse response can be also considered as a transfer function which is influenced by space acoustics of the construction/obstacle of the site C.

Here, in the example shown in FIG. 16A, the positions of the respective microphones/speakers on the closed surface 43 are represented by R1, R2, . . . , RN. Then, as shown in FIG. 16A, the respective transfer functions from the speaker (SP) disposed at R1 to the microphone disposed at R1, to the microphone disposed at R2, . . . , and to the microphone disposed at RN are measured. Subsequently, the respective transfer functions from the speaker disposed at R2 to the microphone disposed at R1, to the microphone disposed at R2, . . . , and to the microphone disposed at RN are measured.

Next, when the transfer function from the speaker positioned at R1 to the microphone positioned at R1 is represented by R11, and the transfer function from the speaker positioned at R1 to the microphone positioned at R2 is represented by R12, a matrix using the transfer functions R can be expressed as Expression (1) shown in FIG. 16A.

The matrix data is accumulated in the management server 3' and the like as an acoustic information parameter, and is used for constructing the sound field of the site C at the site B. Subsequently, with reference to FIG. 16B, the case where the sound field of the site C is constructed using the matrix data at the site B will be described.

FIG. 16B is a diagram illustrating an arithmetic operation using an impulse response group performed by the matrix convolution unit 138. In the example shown in FIG. 16B, let us assume a closed surface in the site B (reproduction environment) side, the closed surface having substantially the same size and the shape at the time of the measurement at the site C. Further, let us assume the case where the number of the plurality of microphones 10B and the number of the plurality of speakers 20B arranged at the site B are also the same as at the time of the measurement at the site C, and the arrangement positions thereof are the same R1, R2, . . . , RN as at the time of the measurement at the site C. However, as shown in FIG. 16B, the plurality of microphones 10B and the plurality of speakers 20B are facing inside of the acoustically closed surface 40B.

Further, as shown in FIG. 16B, frequency axis-based expressions acquired by the respective microphones at the positions of R1, R2, . . . , RN at the site B are represented by V1, V2, . . . , VN. Further, output signals (audio signals) output (reproduced) from the respective speakers at the positions of R1, R2, . . . , RN at the site B are represented by W1, W2, . . . , WN.

In this case, a wave front of sound (voice of the user A or noise) generated inside the acoustically closed surface 40B of the site B reaches the acoustically closed surface 40B and is acquired by the microphones 10B facing the inside positioned at R1, R2, . . . , RN, and the respective microphones 10B acquires sound acquisition signals of V1, V2, . . . , VN.

Then, the matrix convolution unit 138 executes Expression (2) shown in FIG. 16B using the signal group (microphone inputs) of V1, V2, . . . , VN and the matrix (Expression (1)) of the transfer function group described with reference to FIG. 16A, and calculates W1, W2, . . . , WN output from the respective speakers 20B.

As described above, the matrix convolution unit 138 performs the signal process on the audio signals (V1, V2, . . . , VN) acquired by the plurality of microphones 10B, using the acoustic information parameters (transfer function group) of the site C. Further, as shown in FIG. 15, the matrix convolution unit 138 adds the audio signals (W1, W2, . . . , WN) subjected to the signal process to the output buffers of the respective output speakers.

(Addition of Acoustic Content)

As shown in FIG. 15, the sound field reproduction signal processing unit 135 adds acoustic content d of the site C received from the management server 3' through the communication I/F 19 to each of the output buffers of the respective output speakers, and thus, the technique 3 described above is achieved.

Heretofore, the configuration of the sound field reproduction signal processing unit 135 of the signal processing apparatus 1B according to the present embodiment has been described in detail. Next, with reference to FIG. 17, there will be described specifically a sound field reproduction process at the time of constructing the sound field of the site C at the site B.

[4-3. Sound Field Reproduction Process]

Figure 17:
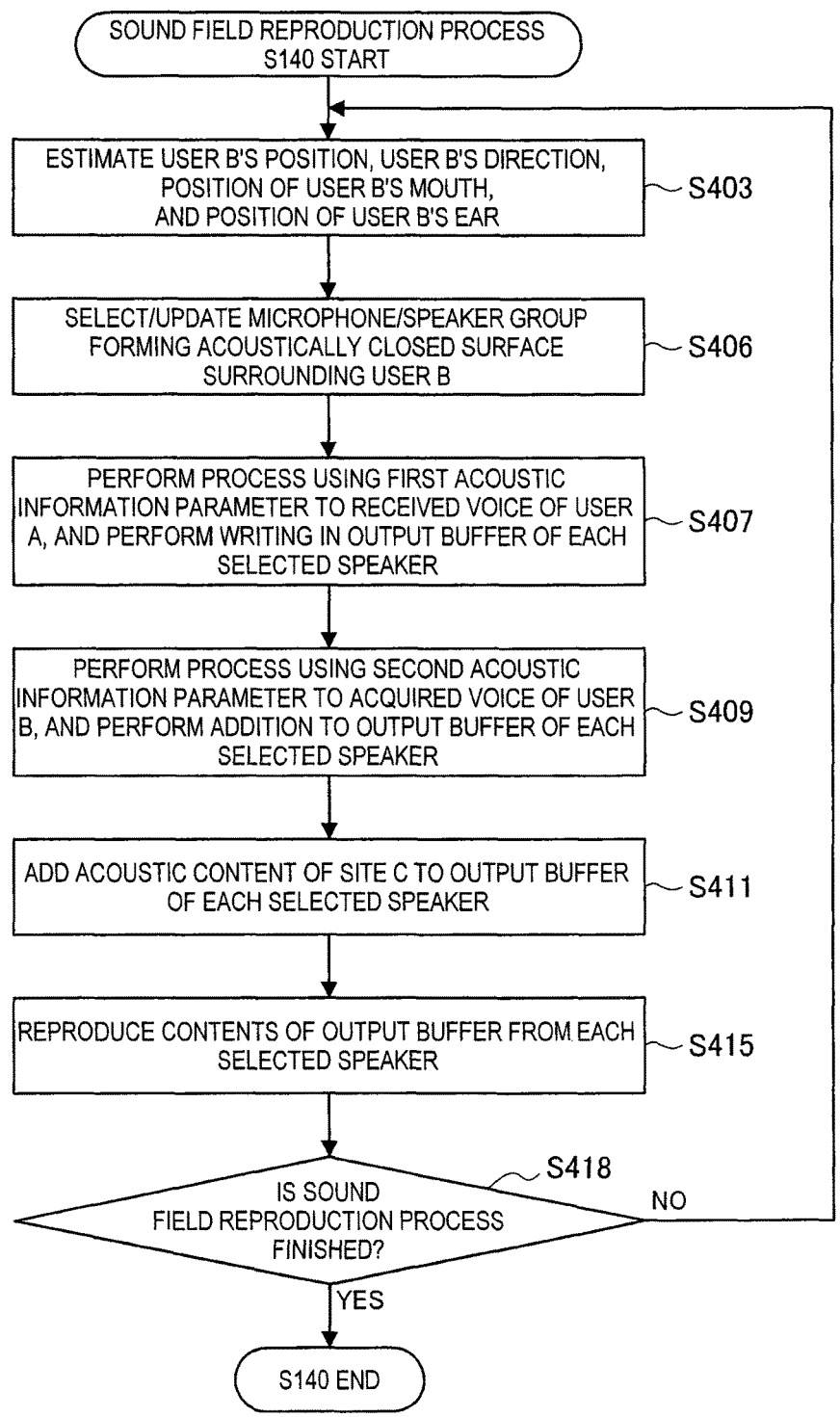
FIG. 17 is a flowchart showing a sound field reproduction process according to the present embodiment.

FIG. 17 is a flowchart showing a sound field reproduction process according to the present embodiment. As shown in FIG. 17, first, in step S403, the user position estimating unit 16 (see FIG. 3) of the signal processing apparatus 1B estimates the position of the user B. For example, the user position estimating unit 16 may estimate the relative position, direction, position of the mouth, and position of the ear of the user B with respect to each speaker 20B on the basis of sound acquired from the plurality of microphones 10B, captured images obtained by the image sensors, and arrangement of the speakers stored in the speaker position information DB 21.

Next, in step S406, the signal processing unit 13 selects a microphone/speaker group forming the acoustically closed surface surrounding the user on the basis of the estimated relative position, direction, position of the mouth, and position of the ear of the user B.

Next, in step S407, the sound field reproduction signal processing unit 135 of the signal processing unit 13 performs, by the convolution unit 136, the process of the technique 1 shown in FIG. 10 on the received audio signal b (voice of the user A acquired at the site A). Specifically, as shown in FIG. 15, the convolution unit 136 performs rendering on the audio signal b received from the signal processing apparatus 1A of the site A for each selected output speaker, using the acoustic information parameter c (first acoustic information parameter) of the site C. Then, the convolution unit 136 writes the audio signal subjected to the process of the technique 1 to the output buffer of each selected output speaker.

Next, in step S409, the sound field reproduction signal processing unit 135 performs, by the matrix convolution unit 138, the process of the technique 2 shown in FIG. 10 on the voice of the user B acquired at the site B using the selected microphone group. Specifically, the matrix convolution unit 138 performs rendering on the audio signal acquired by the microphone group (plurality of microphones 10B) forming the acoustically closed surface surrounding the user B for each output speaker, using the acoustic information parameter c (second acoustic information parameter) of the site C. Then, the matrix convolution unit 138 adds the audio signal subjected to the process of the technique 2 to the output buffer of each selected output speaker.

Next, in step S411, as the process of the technique 3 shown in FIG. 10, the sound field reproduction signal processing unit 135 adds the acoustic content d of the site C to the output buffer of each selected output speaker.

Then, in step S415, the signal processing apparatus 1B outputs contents of each output buffer from the speaker group selected in the above step S406 through the DAC/amplifying unit 23.

As described above, in the acoustic system according to the present embodiment, the voice of the user A acquired at the site A is subjected to rendering using the first acoustic information parameter measured at the site C, and is reproduced from the plurality of speakers 20B of the site B with the echo in the site C. Further, the voice of the user B himself/herself acquired at the site B is subjected to rendering using the second acoustic information parameter measured at the site C, and is reproduced from the plurality of speakers 20B of the site B with the echo in the site C. In addition, the acoustic content acquired at the site C is reproduced from the plurality of speakers 20B of the site B.

In this way, the acoustic system according to the present embodiment can provide, when one site (site B in this case) cooperates (speaks on the telephone) with another site (site A in this case), the feeling of being absorbed in the third space (site C in this case). The user B can obtain a sound field feeling as if the user B were located at the site C with the user A, and can feel more affluent reality.

Further, the sound field reproduction signal processing unit 135 can control an audio image of the received audio signal (user A's voice) using the speaker group arranged around the user B. For example, as the array speaker (beam forming) is formed by the plurality of speakers, the sound field reproduction signal processing unit 135 can reconstruct the user A's voice in the user B's ear, and can reconstruct the user A's audio image outside the acoustically closed surface surrounding the user B.

Note that the continuous execution of steps S403 and S406 enables the signal processing unit 13 to update the speaker group forming the acoustically closed surface surrounding the user B in accordance with the movement of the user B. Hereinafter, specific description will be given with reference to FIG. 18A and FIG. 18B.

Figure 18A:
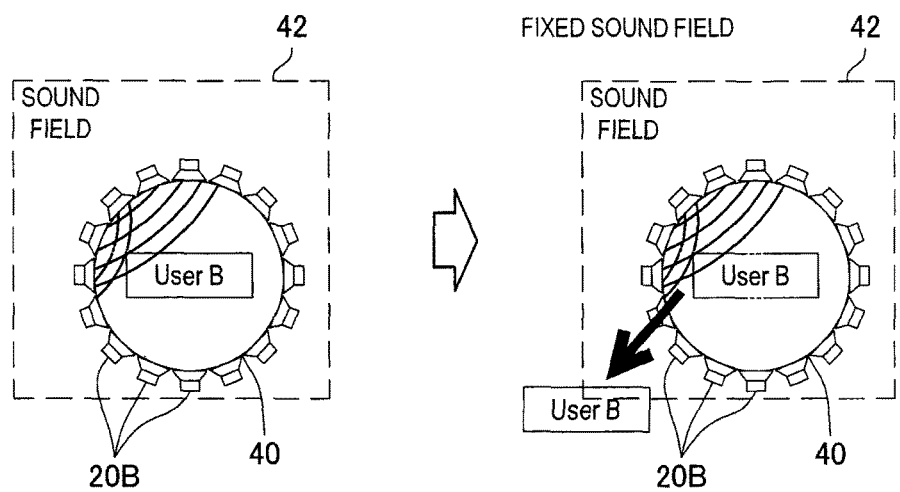
FIG. 18A is a diagram illustrating a case where a sound field constructed in a site B is fixed.

FIG. 18A is a diagram illustrating the case where the sound field 42 constructed in the site B is fixed. As shown in FIG. 18A, let us assume the case where, first, the plurality of speakers 20B are selected (steps S403 and S406) for forming the acoustically closed surface 40 surrounding the user B, and the sound field 42 for providing the user B with the feeling of being absorbed in the site C is constructed. In this case, when the user B moves inside the room or goes out of the room so that the user B moves out of the acoustically closed surface 40, the user B is not in the sound field 42, and thus, the user B cannot obtain the feeling of being absorbed in the site C.

Figure 18B:
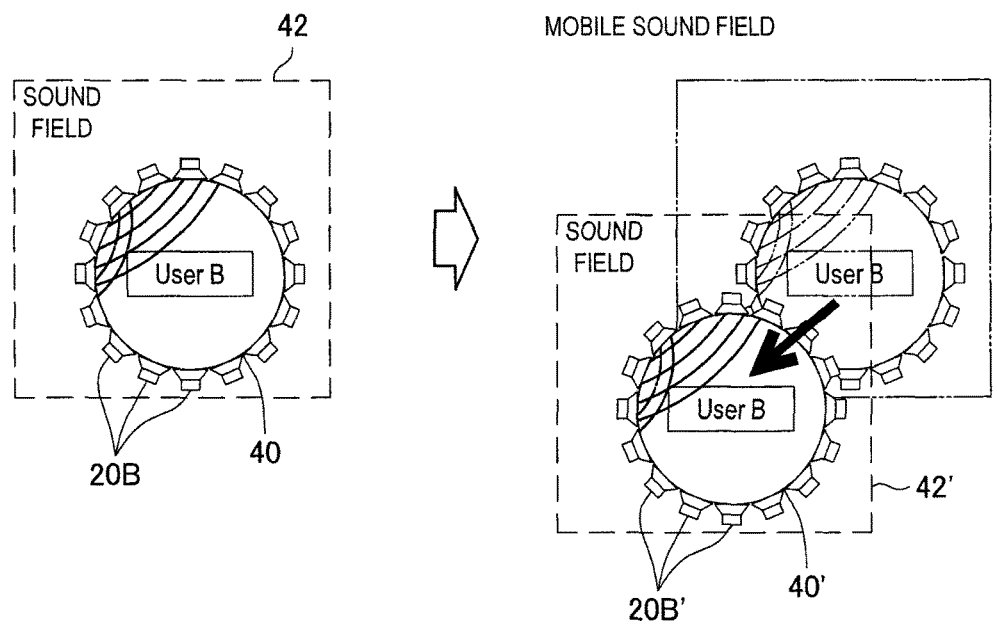
FIG. 18B is a diagram illustrating a case where the sound field constructed in the site B is mobile.

Accordingly, as described above, steps S403 and S406 are executed continuously, and the speaker group forming the acoustically closed surface surrounding the user B is updated in accordance with the movement of the user B. FIG. 18B is a diagram illustrating the case where the sound field 42 constructed in the site B is mobile.

As shown in FIG. 18B, a speaker group (speaker 20B') forming an acoustically closed surface 40' surrounding the user B is newly selected (updated) in accordance with the movement of the user B, and a sound field 42' is newly constructed by the updated plurality of speakers 20B'.

Heretofore, each operation process of the acoustic system according to the present embodiment has been described in detail. Next, a supplement of the present embodiment will be described.

<5. Supplement>

[5-1. Modified Example of Command Input]

In the embodiment above, a command is input by a voice, but the method of inputting a command in the acoustic system according to the present disclosure is not limited to the audio input and may be another input method. For example, the signal processing apparatus 1 according to the present embodiment may detect a user operation on each switch (which is an example of an operation input part) arranged around a user, and may recognize a command such as a call origination request or the like. Further, in this case, the signal processing apparatus 1 is capable of accepting the designation (name or the like of the target user) of the call origination destination and the designation of the place (name of the place) that the user is to be absorbed in, using a touch panel or the like (an example of operation input part) disposed near the user.

Further, the recognizing unit 17 of the signal processing apparatus 1 may analyze a gesture of the user on the basis of an image obtained by an imaging unit disposed near the user or a detection result acquired by an IR thermal sensor, and may recognize the gesture as a command. For example, in the case where the user performs a gesture of making a telephone call, the recognizing unit 17 recognizes the gesture as a call origination request command. Further, in this case, the signal processing apparatus 1 may accept the designation (name or the like of the target user) of the call origination destination and the designation of the place (name of the place) that the user is to be absorbed in from a touch panel or the like disposed near the user, or may determine the designations on the basis of voice analysis.

Further, in the case where a user feels that it is difficult to hear the sound while speaking on the telephone with another user who is located at another site (in the case where the voice of the other user is reproduced from the plurality of microphones 10 arranged around the user), the user may send a request for control of reproducing sound by a gesture. Specifically, for example, the recognizing unit 17 may recognize a gesture of bringing the user's open hand close to the ear or a gesture of bringing both hands close to the top of the head to imitate ears of a rabbit as a command to increase the volume.

As described above, the method of inputting a command in the acoustic system according to the present disclosure is not limited to the audio input, and may be the method using the switch operation or the gesture input.

[5-2. Example of Another Command]

In the embodiment above, there has been described the case where a person is designated as a given target and a call origination request (call request) is recognized as a command, but the command of the acoustic system according to the present disclosure is not limited to the call origination request (call request), and may be another command. For example, the recognizing unit 17 of the signal processing apparatus 1 may recognize a command in which a place, a building, a program, a music piece, or the like which has been designated as a given target is reconstructed in the space at which the user is located.

Further, the acoustic system according to the present embodiment may reconstruct, in the space at which the user is located, another space in real time, or a past space of a designated place, building, or the like (for example, an excellent concert which was performed in the past in a famous theater).

[5-3. Conversion of Large Space into Small Space]

Here, the embodiment described above assumes a case where the closed surface of the site B (reproduction environment) side and the closed surface of the site C (measuring environment) side have substantially the same sizes and shapes with each other, but the present embodiment is not limited thereto. For example, also in the case where the size of the closed surface of the reproduction environment side is smaller than the size of the closed surface of the measuring environment side, the present embodiment is capable of reconstructing the sound field (expanse of space) of the measuring environment in the reproduction environment.

Such a conversion process from the large space into the small space may be performed, before executing the techniques 1 and 3 described above with reference to FIG. 10, on the received audio signal (audio signal of the user A or acoustic content) in the signal processing apparatus 1. Further, by performing such a conversion process in real time, the acoustic system according to the present embodiment can solve the problem of inconsistency in a correspondence relationship of the positions of speakers and microphones between the measuring environment side and the reproduction environment side.

Specifically, for example, the sound field reproduction signal processing unit 135 may use the signal process using the transfer function disclosed in JP 4775487B. In JP 4775487B, a transfer function (measurement data of impulse response) is determined in a sound field of a measuring environment, an audio signal subjected to an arithmetic process based on the transfer function is reproduced in a reconstruction environment, and the sound field (reverberation, localization of an audio image, or the like) of the measuring environment is reconstructed in the reconstruction environment. Hereinafter, with reference to FIGS. 19A to 19C, there will be described a signal process using a transfer function (measurement data of impulse response).

Figure 19A:
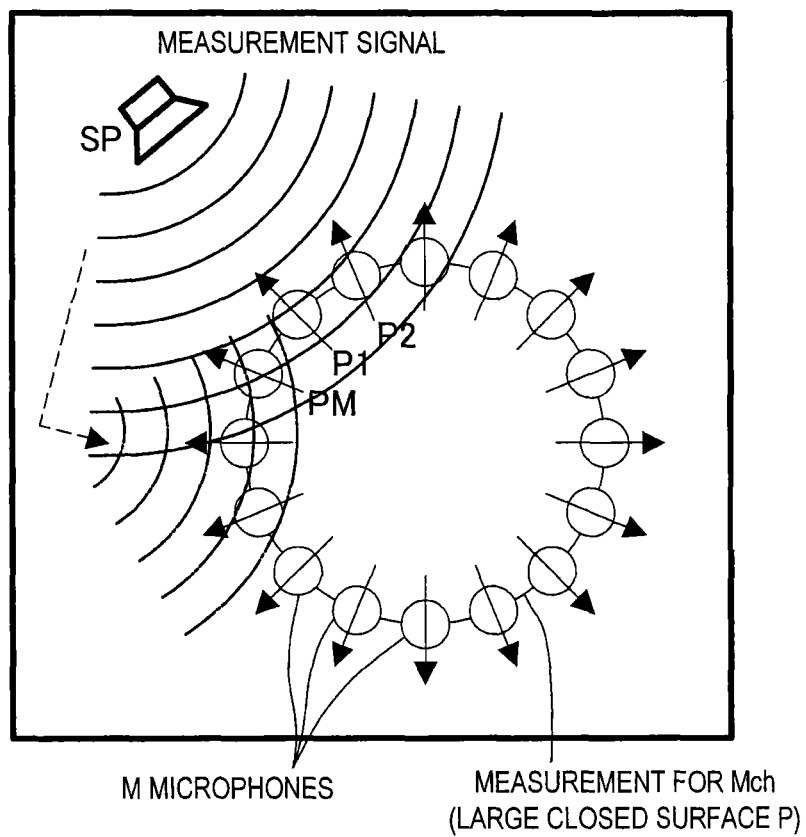
FIG. 19A is a diagram illustrating measurement in a measurement target space.

FIG. 19A is a diagram illustrating measurement in a measurement target space. First, as shown in FIG. 19A, in a measurement target space (large space), M microphones forming a large closed surface P are arranged, and measurement for Mch (M-speakers-output channel) is performed. Further, the positions of the respective M microphones are represented by P1, P2, ..., PM. Then, a measurement signal is output from each of speakers (SP) arranged outside the closed surface P, and an impulse response from each of the speakers to each of the microphones arranged at P1, P2, ..., PM is measured. The thus measured impulse response (transfer function) is shown in Expression (3) in FIG. 19A.

Figure 19B:
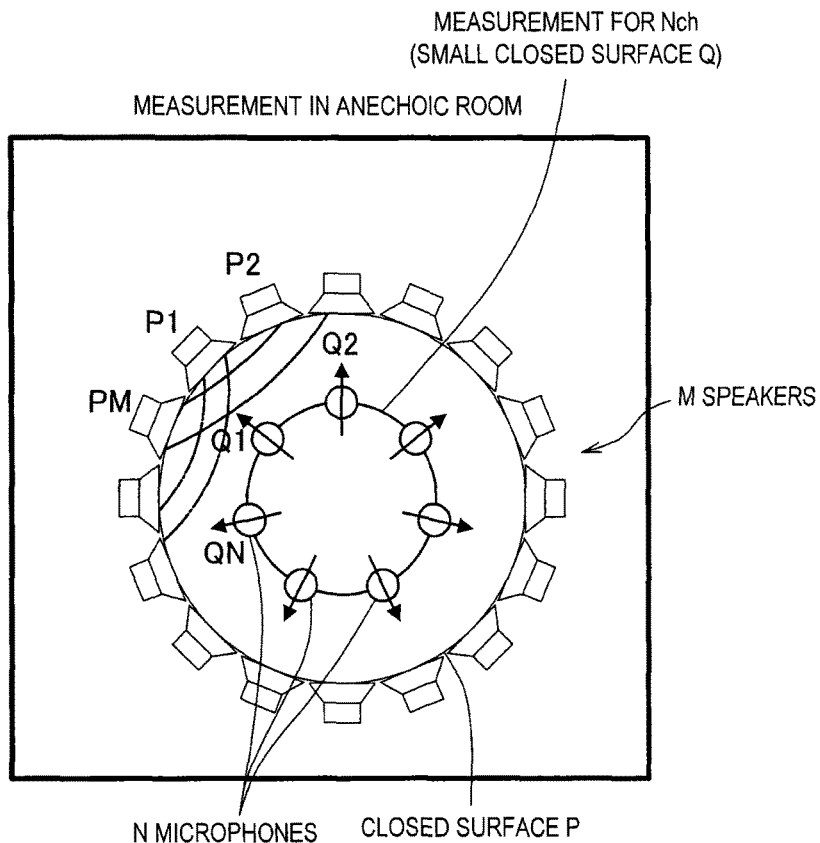
FIG. 19B is a diagram illustrating measurement in an anechoic room.

Next, with reference to FIG. 19B, measurement in an anechoic room will be described. As shown in FIG. 19B, in the anechoic room, M speakers forming a large closed surface P are arranged, N microphones forming a small closed surface Q are arranged inside the closed surface P, and measurement for Nch (N-speakers-output channel) is performed. Here, the positions of the respective M speakers are represented by P1, P2, ..., PM, which are the same positions as those of FIG. 19A. Further, the positions of the respective N microphones are represented by Q1, Q2, ..., QN.

Then, a sound (measurement signal) acquired by the microphone disposed at P1 of FIG. 19A is output from the speaker disposed at P1, and an impulse response to each of the microphones disposed at Q1, Q2, ... QN is measured. Next, a sound (measurement signal) acquired by the microphone disposed at P2 of FIG. 19A is output from the speaker disposed at P2, and an impulse response to each of the microphones disposed at Q1, Q2, ... QN is measured. In this way, all of impulse responses from M speakers to microphones disposed at Q1, Q2, ... QN are measured.

The thus measured M vertical vectors are put into M×N matrix operation, and thus are converted into N outputs. That is, the thus measured impulse responses (transfer functions) are put into a matrix (generating a matrix of transfer function group) as shown in Expression (4) of FIG. 19B, and in this way, the conversion from the large space (coefficient for Mch) into the small space (coefficient for Nch) is achieved.

Figure 19C:
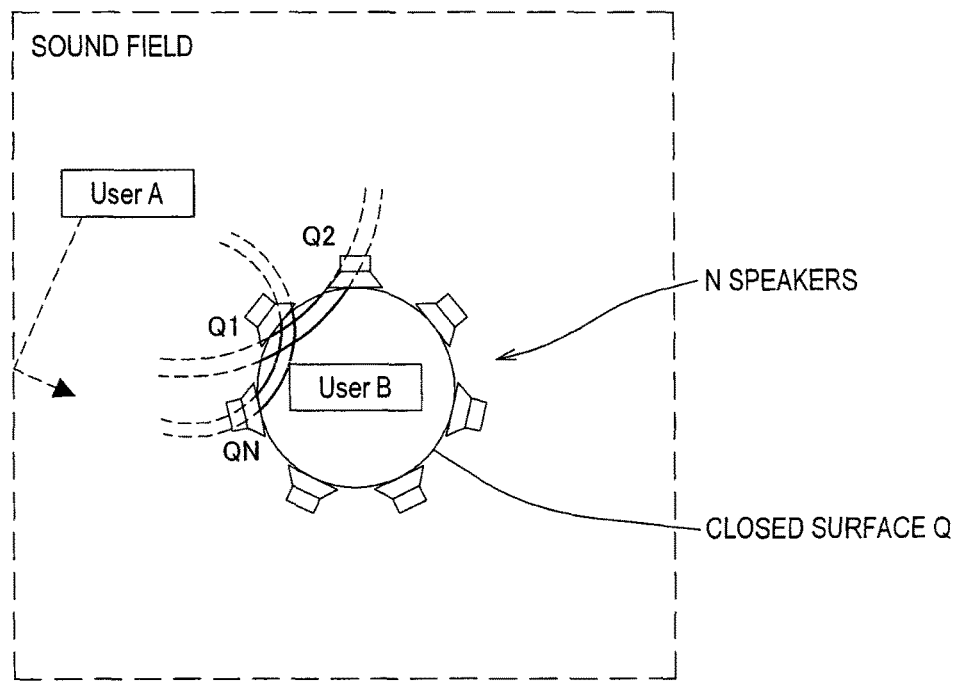
FIG. 19C is a diagram illustrating reconstruction in a reproduction target space.

Next, with reference to FIG. 19C, reconstruction in a reproduction target space (small space) will be described. As shown in FIG. 19C, N speakers forming a small closed surface Q surrounding a user B are arranged in the reproduction target space. Here, the positions of the respective N speakers are represented by Q1, Q2, ..., QN, which are the same positions as those of FIG. 19B.

In this case, when the respective speakers disposed at Q1, Q2, ..., QN output the received audio signals (for example, the voice of the user A: audio signal S), the output of each speaker is determined by Expression (5) shown in FIG. 19C. Expression (5) is an arithmetic operation using the impulse responses (transfer functions) shown in Expression (3) and Expression (4).

In this way, in the case where the audio image of the user A is localized outside the closed surface Q, for example, a wave front at the time at which the voice emitted by the user A located outside the closed surface Q crosses the closed surface Q as shown in FIG. 19C is estimated, and the estimated wave front is created inside the closed surface Q. In this case, the inconsistency between the number of microphones in the measurement target space and the number of speakers in the reproduction target space is converted by Expression (5), and in this way, the acoustic system according to the present embodiment can reconstruct the sound field of the large closed surface P in the small closed surface Q.

[5-4. Video Construction]

In addition, the provision of the feeling of being absorbed in the third space is achieved by the sound field construction (sound field reproduction process) in the embodiment described above, but the acoustic system according to the present disclosure is not limited thereto, and may also use video construction.

For example, when the signal processing apparatus 1 receives a video obtained by a plurality of image sensors arranged at the third space (site C) from a given server and reproduces at the site B a voice acquired by a plurality of microphones arranged at the site A, the signal processing apparatus 1 may reproduce the video of the site C and may reconstruct the space of the site C.

The reproduction of the video may be space projection using hologram reproduction, and may be reproduction using a television in a room, a display, or a head mounted display. In this way, by performing video construction together with the sound field construction, the user can be provided with a feeling of being absorbed in the third space, and can feel more affluent reality.

[5-5. Another System Configuration Example]

In the system configuration of the acoustic system according to the embodiment described with reference to FIG. 1 and FIG. 2, both the call origination side (site A) and the call destination side (site B) have the plurality of microphones and speakers around the user, and the signal processing apparatuses 1A and 1B perform the signal process. However, the system configuration of the acoustic system according to the present embodiment is not limited to the configuration shown in FIG. 1 and FIG. 2, and may be the configuration as shown in FIG. 20, for example.

Figure 20:
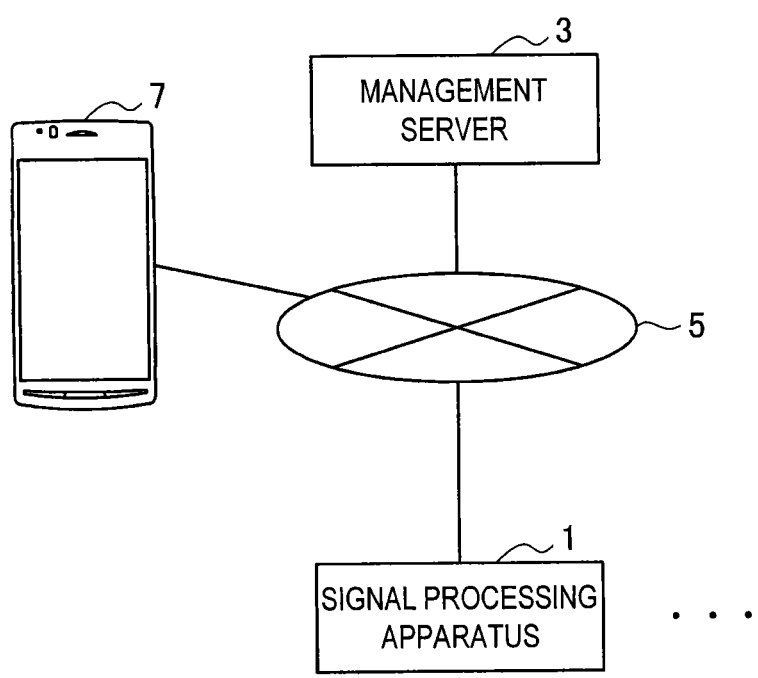
FIG. 20 is a diagram showing another system configuration of the acoustic system according to the present embodiment.

FIG. 20 is a diagram showing another system configuration of the acoustic system according to the present embodiment. As shown in FIG. 13, in the acoustic system according to the present embodiment, a signal processing apparatus 1, a communication terminal 7, and a management server 3 are connected to each other through a network 5.

The communication terminal 7 includes a mobile phone terminal or a smartphone including a normal single microphone and a normal single speaker, which is a legacy interface compared to an advanced interface space according to the present embodiment in which a plurality of microphones and a plurality of speakers are arranged.

The signal processing apparatus 1 according to the present embodiment is connected to the normal communication terminal 7, and can reproduce a voice received from the communication terminal 7 from the plurality of speakers arranged around the user. Further, the signal processing apparatus 1 according to the present embodiment can transmit the voice of the user acquired by the plurality of microphones arranged around the user to the communication terminal 7.

As described above, according to the acoustic system according to the present embodiment, a first user located at the space in which the plurality of microphones and the plurality of speakers are arranged nearby can speak on the telephone with a second user carrying the normal communication terminal 7. That is, the configuration of the acoustic system according to the present embodiment may be that one of the call origination side and the call destination side is the advanced interface space according to the present embodiment in which the plurality of microphones and the plurality of speakers are arranged.

[5-6. Autonomous Acoustic System]

As described with reference to FIGS. 1 to 3, in the embodiment described above, the signal processing apparatus 1 controls input and output of the plurality of microphones 10 and the plurality of speakers 20 arranged around the user, but the configuration of the acoustic system according to the present disclosure is not limited thereto. For example, a plurality of autonomous microphone and speaker devices may be arranged around the user, the devices may communicate with each other, an acoustically closed surface surrounding the user may be formed by determination of each of the devices, and thus, the construction of the sound field described above may be achieved. Hereinafter, such an autonomous acoustic system may be described specifically with reference to FIGS. 21 to 24. Note that, in the autonomous acoustic system described here, a case will be described as an example where a plurality of devices 100 each including one microphone 10 and one speaker 20 are arranged around the user.

(System Configuration)

Figure 21:
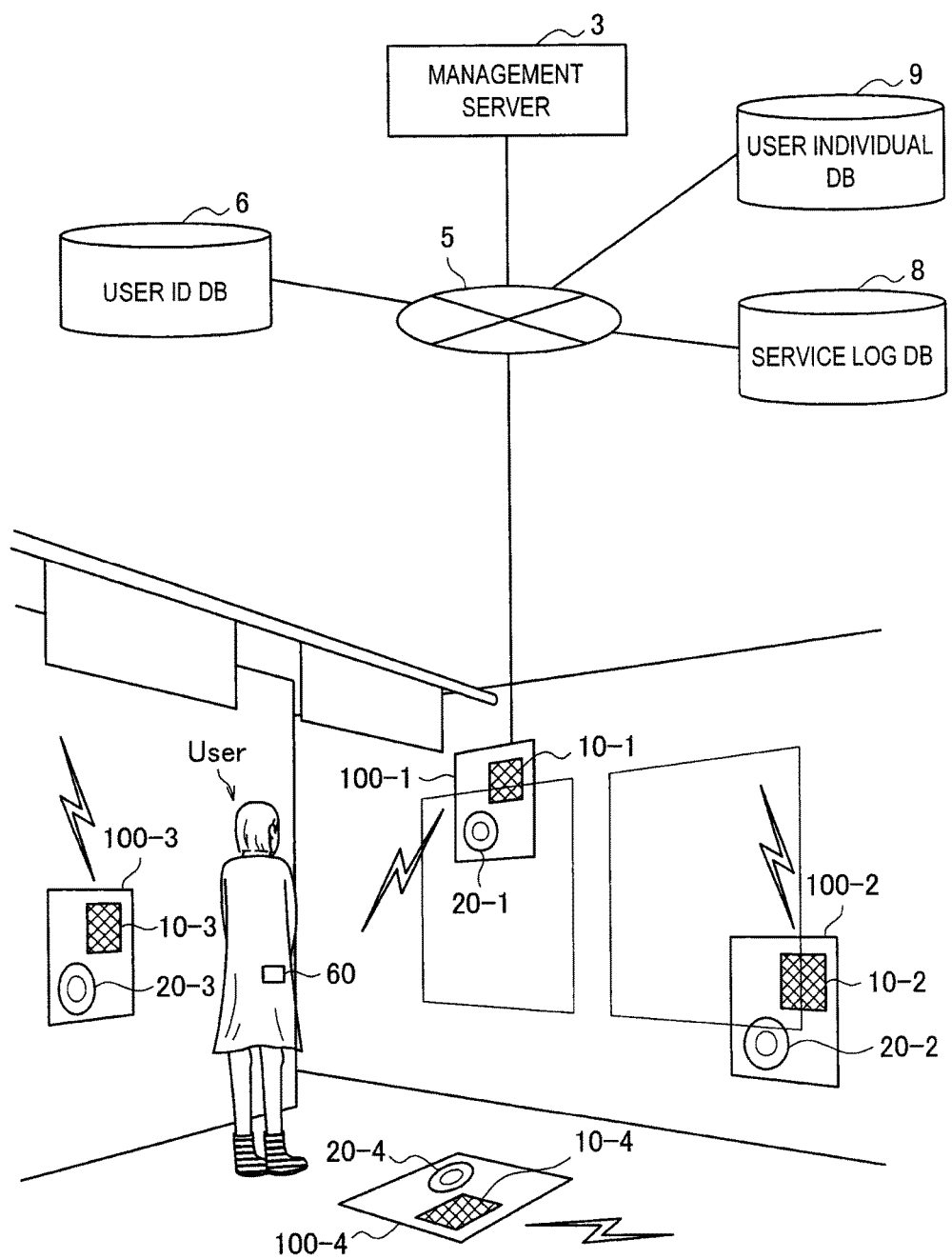
FIG. 21 is a diagram showing an example of a system configuration of an autonomous acoustic system according to the present embodiment.

FIG. 21 is a diagram showing an example of a system configuration of an autonomous acoustic system according to the present embodiment. As shown in FIG. 21, the autonomous acoustic system according to the present disclosure includes a plurality of devices 100 (100-1 to 100-4), a management server 3, a user ID DB 6, a service log DB 8, and a user individual DB 9. Further, as shown in FIG. 21, the management server 3, the user ID DB 6, the service log DB 8, and the user individual DB 9 are connected to each other through a network 5.

Device

The plurality of devices 100 (100-1 to 100-4) are arranged everywhere in the world such as rooms, houses, buildings, outdoor sites, regions, and countries. In the example shown in FIG. 21, a case is shown where the plurality of devices 100 are arranged on the walls and a floor of a public place such as a department store or a station. Further, the plurality of devices 100 (100-1 to 100-4) are communicable with each other via wire or radio, and are reporting each other their capabilities. Further, at least one device 100 (for example, device 100-1) out of the plurality of devices 100 (100-1 to 100-4) is accessible to the network 5. Further, the devices 100 each include a microphone 10 and a speaker 20. Note that the configuration of the device according to the present embodiment will be described later with reference to FIG. 22.

Reporting of Information

As described above, the plurality of devices 100 (100-1 to 100-4) report each other their capabilities (characteristic information). The characteristic information to be reported includes a device ID, a service that the device can provide, an owner ID of the device, a device lending attribute, and the like. Here, the owner ID represents the ID of the owner of (person who has installed) the device 100, and it is estimated that each of the devices 100 (100-1 to 100-4) shown in FIG. 21 is installed by an individual or a corporation. Further, the device lending attribute represents information indicating an attribute of a service of which lending (use) is permitted in advance by an individual or a corporation who/which has installed the device.

Further, the reporting of the information is autonomously and distributedly performed regularly or on demand. Further, the method of reporting information according to the present embodiment may use procedure generally known as a method of constructing a mesh network (beaconing in IEEE802.11s).

Further, the device 100 may also include a plurality of types of communication I/F's. In this case, each device 100 regularly checks which communication I/F is communicable with which device, and the communication I/F that is capable of communicating directly with the largest number of devices is activated with high priority.

Further, each device 100 may forward information reported from a device nearby to a device located several hops away using a wireless I/F, or may transmit the information to another device through the network 5.

Management Server

As described with reference to FIG. 2 and FIG. 5, the management server 3 manages an absolute position (current position) of each user. Alternatively, the management server 3 may also be the management server 3' which accumulates the acoustic information parameter of the third space or the like described with reference to FIG. 11.

Service Log DB

The service log DB 8 is a storage unit which stores contents of a service, a device 100 that contributed to the provision of the service, and a user who provides the service in association with each other. In this way, the following can be grasped using the service log DB 8: which device is used for what kind of service provision, what service is provided to which user, and the like.

Further, a service log stored in the service log DB 8 may be used later as charging information to a user who has used a service, or may be used as kickback information to a person (individual/corporation) who has installed the device 100 contributed to the service provision. Here, the kickback information is information used when providing the owner of (person who has installed) the device 100 with a part of usage charge depending on a rate of contribution (frequency) or the like to the service provision of the device 100. Further, the service log stored in the service log DB 8 may be transmitted to the user individual DB 9 as metadata of a user's action.

User Individual DB

The user individual DB 9 stores metadata of user's actions transmitted from the service log DB 8 as data held by the user. The data stored in the user individual DB 9 may be used in various individualized services and the like.

User ID DB

The user ID DB 6 is a storage unit which stores a registered user's ID (name, identification number, or biological information) and a service the provision of which is permitted to the user in association with each other. The user ID DB 6 is used when the device 100 performs user authentication.

Heretofore, the system configuration of the autonomous acoustic system according to the present embodiment has been described with reference to FIG. 21. Subsequently, with reference to FIG. 22, a configuration of the device 100 (signal processing apparatus) according to the present embodiment will be described.

(Configuration of Device)

Figure 22:
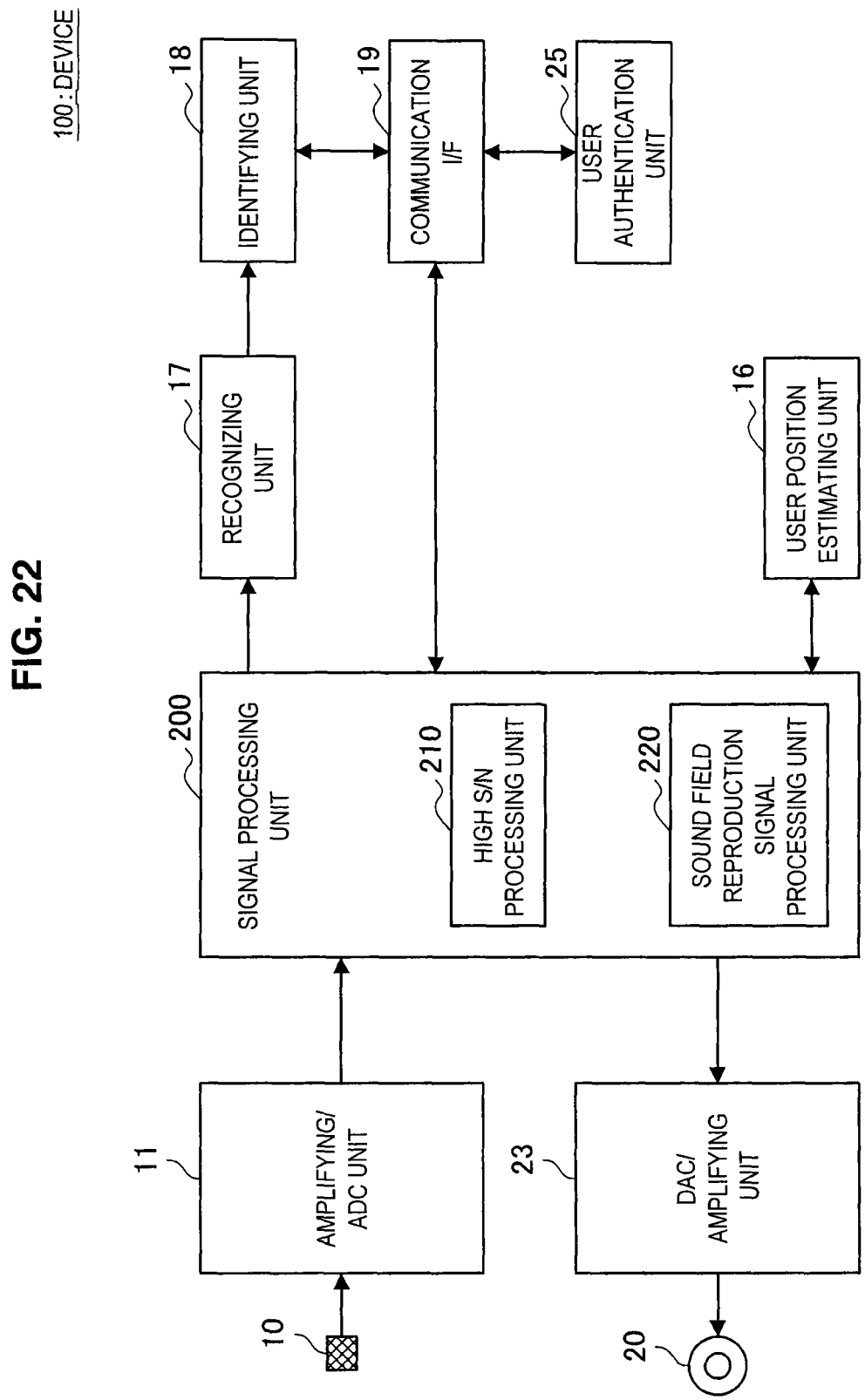
FIG. 22 is a block diagram showing a configuration of a device having the autonomous acoustic system according to the present embodiment.

FIG. 22 is a block diagram showing a configuration of the device 100 according to the present embodiment. As shown in FIG. 22, the device 100 includes a microphone 10, an amplifying/ADC unit 11, a signal processing unit 200, a recognizing unit 17, an identifying unit 18, a communication IN 19, a user authentication unit 25, a user position estimating unit 16, a DAC/amplifying unit 23, and a speaker 20. Since the descriptions of the microphone 10, the amplifying/ADC unit 11, the recognizing unit 17, the identifying unit 18, the communication I/F 19, the user position estimating unit 16, the DAC/amplifying unit 23, and the speaker 20 have been given with reference to FIG. 3, the descriptions thereof will be omitted here.

Signal Processing Unit

The signal processing unit 200 includes a high S/N processing unit 210 and a sound field reproduction signal processing unit 220. In the same manner as the high S/N processing unit 133 shown in FIG. 3, the high S/N processing unit 210 has a function of processing an audio signal output from the amplifying/ADC unit 11 to form a monaural signal having high articulation and a high S/N ratio. Specifically, the high S/N processing unit 210 performs sound source separation, and performs dereverberation and noise reduction. The audio signal processed by the high S/N processing unit 210 is output to the recognizing unit 17 and subjected to voice analysis for command recognition, and transmitted to an external device through the communication I/F 19.

The sound field reproduction signal processing unit 220 performs a signal processing on the audio signal reproduced from the speaker 20, and performs control such that a sound field is localized near the user's position. Further, the sound field reproduction signal processing unit 220 cooperates with another adjacent device 100, and controls the contents (audio signal) output from the speaker 20 so as to form the acoustically closed surface surrounding to the user.

User Authentication Unit

The user authentication unit 25 performs user authentication by sending a query to the user ID DB 6 on the network 5 through the communication I/F 19 on the basis of a user ID acquired from a tag such as an RFID possessed by a user. For example, in the case where the acquired user ID corresponds to an ID registered in the user ID DB 6 in advance, the user authentication unit 25 authenticates the user as a user to whom the provision of the service is permitted.

Heretofore, the configuration of the device 100 according to the present embodiment has been described in detail. Subsequently, with reference to FIG. 23, an operation process of the autonomous acoustic system according to the present embodiment will be described.

(Operation Process)

Figure 23:
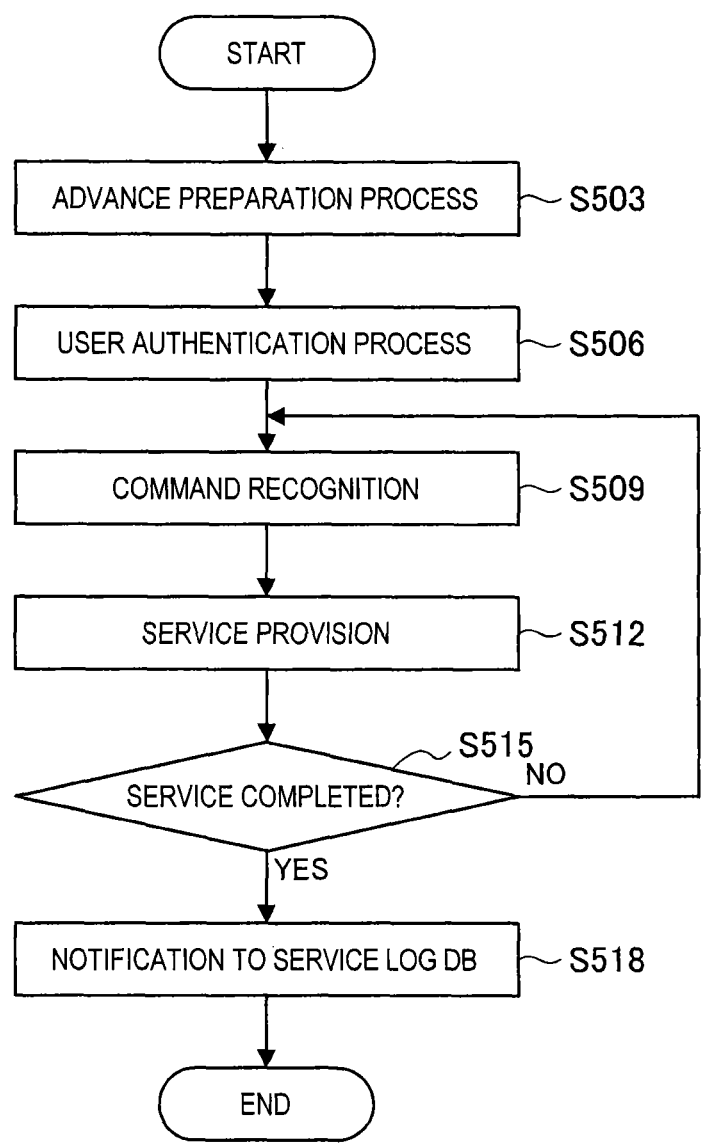
FIG. 23 is a flowchart showing an operation process of the autonomous acoustic system according to the present embodiment.

FIG. 23 is a flowchart showing an operation process of the autonomous acoustic system according to the present embodiment. As shown in FIG. 23, first, in step S503, the device 100 performs an advance preparation process. Specifically, the device 100 and another device 100 report the above-mentioned characteristic information with each other, and the device 100 confirms a device which can cooperate with the device 100 (which is worthy of trust).

For example, the device 100-1 may confirm whether the adjacent device 100-2 is worthy of trust on the basis of an owner ID, a lending attribute, or the like included in the characteristic information received from the adjacent device 100-2. The devices which have confirmed that are worthy of trust with each other start their actuators and capture the output results by the sensors of the adjacent devices, for example. In this way, the devices can grasp what sort of cooperation can be performed by combining the characteristics of the devices. Such a confirmation procedure may be performed regularly. Further, through the confirmation procedure, each device 100 is capable of loosely grasping what sort of service can be provided in the space in which the plurality of adjacent devices 100 (100-1 to 100-4) are arranged.

Next, in step S506, in the case where a user enters the space in which the plurality of devices 100 (100-1 to 100-4) are arranged, the devices 100 perform user authentication. For example, as shown in FIG. 21, in the case where the user possesses a tag 60 such as an RFID, the devices 100-1 to 100-4 arranged nearby may receive characteristic information reported from the tag 60 and may detect the entrance of the user. Then, when detecting the entrance of the user, each device 100 authenticates whether the user is a user to whom a service can be provided by sending a request to the user ID DB 6 on the network 5, on the basis of a user ID included in the characteristic information reported from the tag 60.

Note that, in the case where the user does not possess the tag 60, the devices 100-1 to 100-4 may detect the entrance of the user using sensors (microphone, camera, human sensor, thermal sensor, and the like). Further, the devices 100-1 to 100-4 may extract the ID (biological information or the like) of the user by analyzing the detection results of the sensors.

Further, in the example shown in FIG. 21, the device 100-1 among the devices 100-1 to 100-4 holds an access route to the user ID DB 6. In this case, the user authentication may be performed as follows: the device 100-2, 100-3, or 100-4 which has acquired a user ID transmits the user ID to the device 100-1, and the device 100-1 sends a request to the user ID DB 6. In this way, it is not necessary that all of the plurality of devices 100-1 to 100-4 each hold an access to the user ID DB 6.

Further, a result of user authentication performed by one device 100 among the devices 100-1 to 100-4 is shared between other devices 100 disposed nearby, and the devices 100-1 to 100-4 can grasp that a service can be provided to the user.

Next, in step S509, the device 100 recognizes a command (service request) from the user. Here, the device 100 may notify the tag 60 of information of the services that can be provided to the authenticated user. The tag 60 can notify the user of what sort of service can be received at the place using output means (not shown) such as a speaker or a display unit. Further, the tag 60 also specifies a service that the user currently desires from the user's command input (by microphone, gyro, key touch, or the like), and notifies the devices 100-1 to 100-4 disposed nearby of the service.

Note that, in the case where the user does not possess the tag 60, the devices 100-1 to 100-4 may analyze the voice or the gesture of the user using sensors (microphone, camera, human sensor, thermal sensor, and the like), and may recognize the service that the user desires.

The command recognized by the device 100 here may be, in addition to the above-mentioned call origination request (call request), a command that requests reconstruction of a place, a building, a program, a music piece, or the like which has been designated as a given target.

Next, in step S512, in the case where the requested service is a service permitted to the user, the devices 100-1 to 100-4 start providing the service. Specifically, for example, the devices 100-1 to 100-4 start operations of a sensor (for example, microphone 10) and an actuator (for example, speaker 20), and make communication paths between the devices be in operation states. Further, the devices 100-1 to 100-4 may cooperate with each other and determine their own operations on the basis of the type of the service to provide and the amount of available communication resources.

Further, the in the case where the device 100 has a plurality of types of communication I/F's, a communication I/F used for traffic transmission may be operated according to the needs on the basis of the amount of information to be provided. Further, the device 100 may increase an operation duty cycle as needed, and an electric power saving mode may be partially cancelled. In addition, the devices 100 may set each other's transmission/reception time period used for communication, to thereby transit to the state where the band can be supplied stably (starting up of reservation access to IEEE802.11s).

Next, in step S515, in the case where the completion of the service is designated by the user, the device 100 completes the provision of the service. Specifically, for example, the device 100 finishes the operations of a sensor (for example, microphone 10) and an actuator (for example, speaker 20), and make communication paths between the devices be in stop states.

Next, in step S518, the device 100 notifies the service log DB 8 of the contents to which the device 100 has contributed in the latest service provision. Further, the device 100 may also notify the service log DB 8 of information of the user (authenticated user) to whom the service has been provided.

Heretofore, the operation process of the autonomous acoustic system according to the present embodiment has been described specifically with reference to FIG. 23. Hereinafter, an additional description of the autonomous acoustic system according to the present embodiment will be described.

(Service Continuation)

The autonomous acoustic system according to the present embodiment can continuously provide the user with the service even in the case where the authenticated user walks and moves to another place, by changing the device 100 that provides the user with the service (device 100 that operates). Such a changing process is performed on the basis of radio wave intensity from the tag 60 possessed by the user and input signals from sensors (microphone, camera, human sensor, and the like) possessed by each device, for example. Hereinafter, description will be given with reference to FIG. 24.

Figure 24:
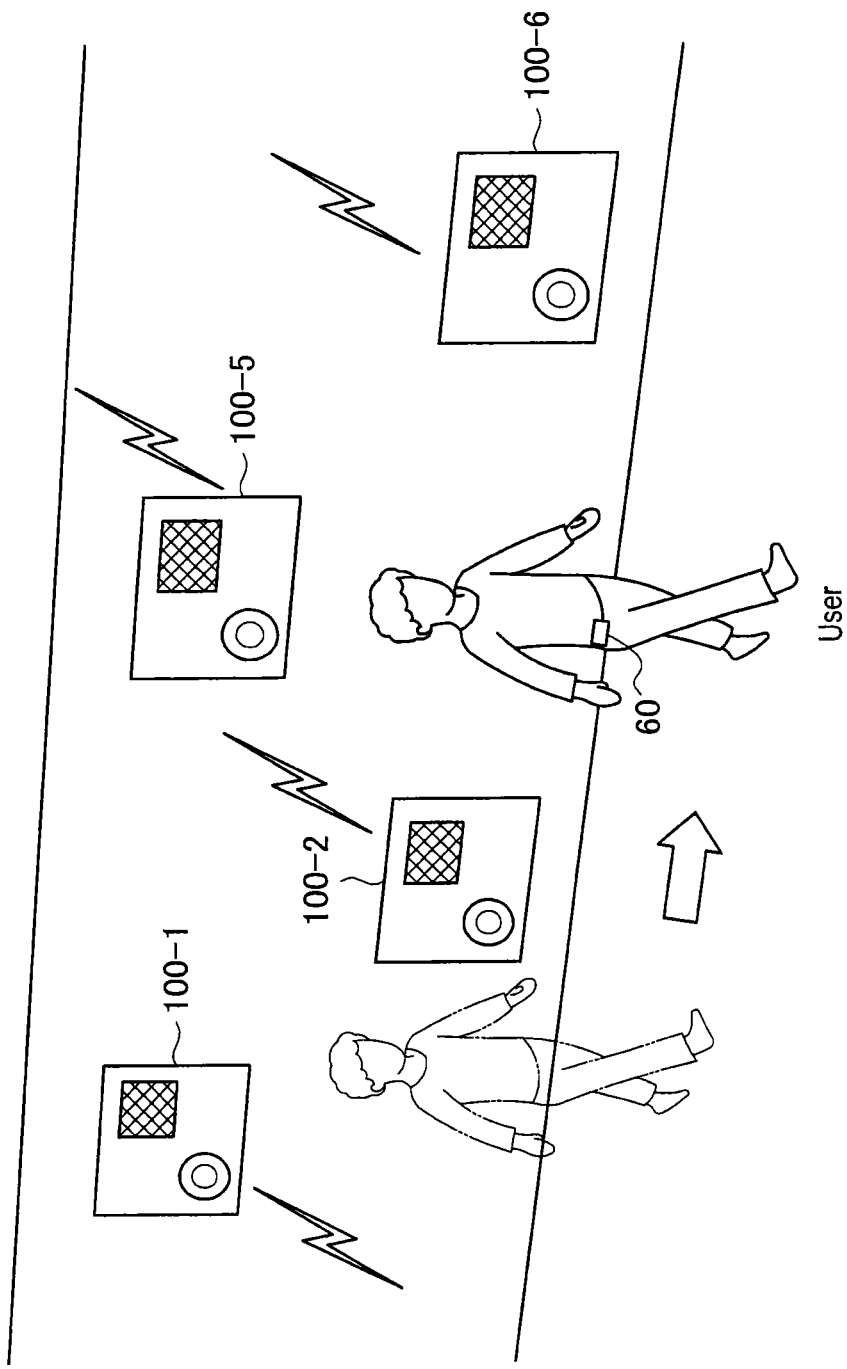
FIG. 24 is a diagram illustrating change of operating devices in accordance with movement of a user in the autonomous acoustic system according to the present embodiment.

FIG. 24 is a diagram illustrating change of operating devices in accordance with movement of a user in the autonomous acoustic system according to the present embodiment. As shown in FIG. 24, here, let us assume the case where the user moves away from the device 100-1 and the device 100-2 which are operating for providing the user with a service and comes close to the devices 100-5 and 100-6 which are not performing the operation for the service provision.

In this case, the devices 100-5 and 100-6 detect that the user has approached on the basis of radio wave intensity from the tag 60 possessed by the user or input signals from sensors included in the devices 100-5 and 100-6. Then, the devices 100-5 and 100-6 receive the ID of the user and information of a service that may be provided to the user from the device 100-2 and the like which is placed adjacently.

Then, the devices 100-5 and 100-6 start service provision to the user on the basis of the received information. On the other hand, the devices 100-1 and 100-2 which have been performing the service provision finish the service provision when determining that the user moves out from the area in which the sensors and the actuators of the devices 100-1 and 100-2 can provide the service, and bring the operation of the devices and the communication path down.

In this way, if the user moves while receiving the service provision, the device 100 disposed near the destination can takes over the user ID and the contents of the service, and can continuously provide the user with the service.

(Access Route to Network 5)

In the autonomous acoustic system according to the present embodiment described with reference to FIG. 21, at least one device 100 (here, device 100-1) out of the devices 100-1 to 100-4 has an access route to the network 5. However, the configuration of the autonomous acoustic system according to the present disclosure is not limited to the example shown in FIG. 21, and there may be a case where the devices 100-1 to 100-4 are in a closed network and do not have the access route to the outside (network 5).

In such a case, the devices 100-1 to 100-4 may use the tag 60 possessed by the user, for example, as an access gateway to the outside. That is, under the state in which the devices 100-1 to 100-4 report each other specific information, at the time point at which the tag 60 appears, the devices 100-1 to 100-4 send a query to the user ID DB 6 on the network 5 through the tag 60 and perform user authentication.

(Service Provision to Plurality of Users)

Next, with reference to FIG. 25, there will be described service provision in the case where a plurality of users enter the space in which the devices 100-1 to 100-4 are arranged.

Figure 25:
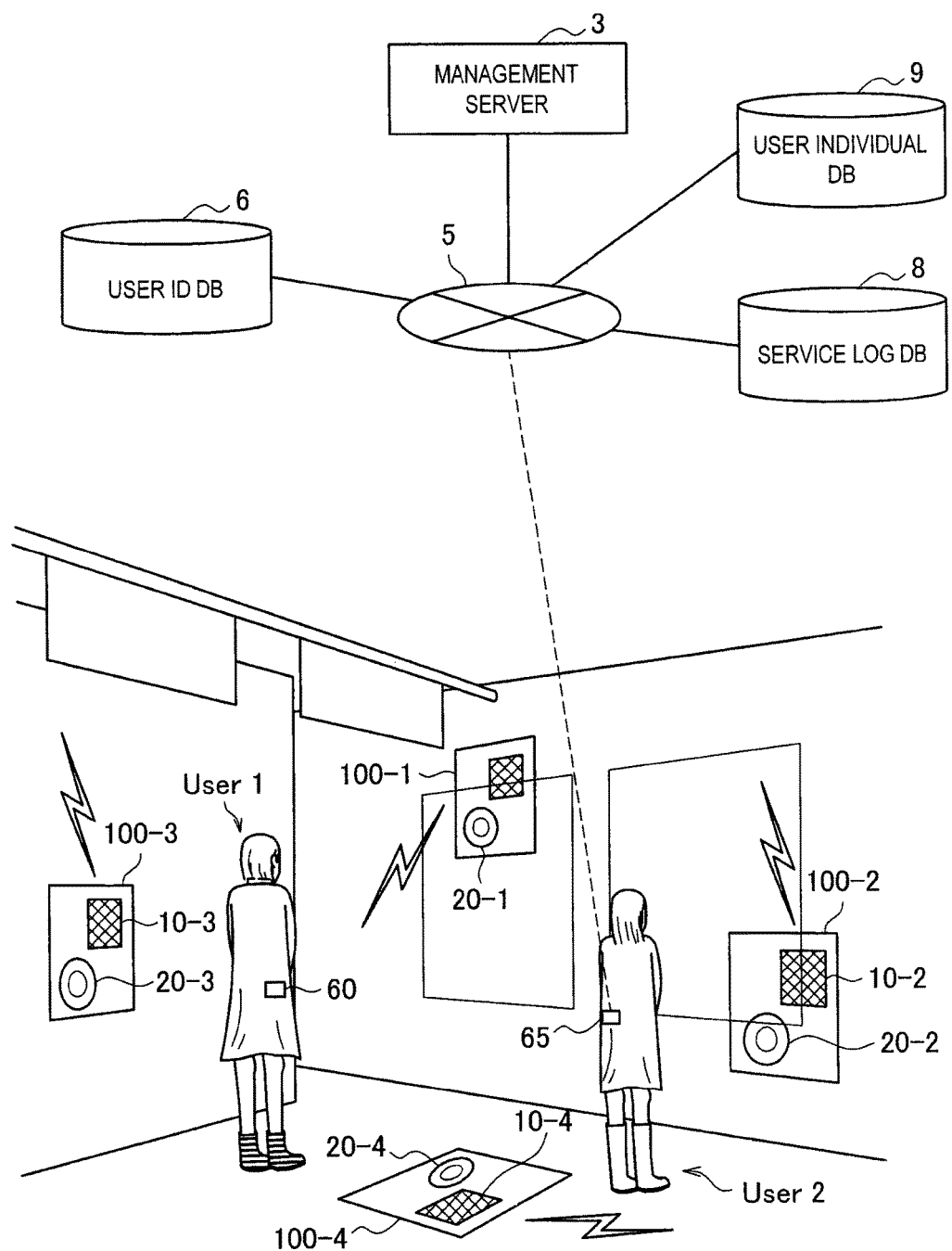
FIG. 25 is a diagram illustrating a case where a service is provided to a plurality of users in the autonomous acoustic system according to the present embodiment.

FIG. 25 is a diagram illustrating a case where a service is provided to a plurality of users in the autonomous acoustic system according to the present embodiment. As shown in FIG. 25, in the case where the plurality of users enter the space in which the devices 100-1 to 100-4 are arranged and each perform a service request, each of the devices 100-1 to 100-4 provides a plurality of services.

In this case, although the operations of the devices 100-1 to 100-4 with respect to each user is as described with reference to FIGS. 21 to 24, a tag 65 possessed by a user 2 is regarded as one of the devices arranged nearby for a tag 60 possessed by a user 1. In addition, the tag 60 possessed by the user 1 is also regarded as one of the devices arranged nearby for the tag 65 possessed by the user 2.

Accordingly, the devices 100-1 to 100-4 perform reporting of the characteristic information also with the tag 60 or the tag 65, and confirms whether the device is worthy of trust. In this way, the characteristics of the tag 60 or the tag 65 may be used for the service provision.

For example, in the case where the devices 100-1 to 100-4 are in a closed network, the devices 100-1 to 100-4 grasp that the tag 65 holds an access route to the outside network 5 from the reporting of the characteristic information with the tag 65. Then, in providing the user 1 possessing the tag 60 with the service, the devices 100-1 to 100-4 use the tag 65 possessed by the user 2 as one of the devices, and thereby being able to connect to the outside network 5.

In this way, not being limited to the devices 100-1 to 100-4 arranged around the user 1, but also the tag 65 possessed by the user 2 located nearby may provide the user 1 possessing the tag 60 with an access to the outside network.

Note that, in such a case, the contents of the service provided by the tag 65 may be written in the service log DB 8, and may be used when later performing, with respect to the user 2 possessing the tag 65, kickback based on the fact of being contributed to the service provision to the user 1.

<6. Conclusion>

As described above, in the acoustic system according to the present embodiment, it becomes possible to provide a feeling of being absorbed in a third space at a time of causing the space surrounding the user to cooperate with another space. Specifically, the acoustic system according to the present embodiment can reproduce a voice and an image corresponding to a first given target (person, place, building, or the like) through a plurality of speakers and displays arranged around the user. Further, in this case, the acoustic system according to the present embodiment can reproduce a space of a second given target (place or the like), and can provide the feeling of being absorbed in the second given target and the ambience. In this manner, using the microphones 10, the speakers 20, the image sensors, and the like arranged everywhere, indoor sites and outdoor sites, it becomes possible to substantially augment over a large area the body such as the mouth, eyes, ears of the user, and to achieve a new communication method.

In addition, since microphones and image sensors are arranged everywhere in the acoustic system according to the present embodiment, the user does not have to carry a smartphone or a mobile phone terminal. The user specifies a given target using a voice or a gesture, and can establish connection with a space surrounding the given target.

Further, the configuration of the acoustic system for achieving such a new communication method may be achieved by the signal processing apparatus which controls a plurality of microphones and a plurality of speakers. Further, the acoustic system according to the present embodiment may be achieved as follows: the devices such as each autonomous microphone and each autonomous speaker cooperate with another adjacent device.

The preferred embodiments of the present disclosure have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

For example, the configuration of the signal processing apparatus 1 is not limited to the configuration shown in FIG. 3, and the configuration may be that the recognizing unit 17 and the identifying unit 18 shown in FIG. 3 are not provided to the signal processing apparatus 1 but are provided on the server side which is connected thereto through a network. In this case, the signal processing apparatus 1 transmits an audio signal output from the signal processing unit 13 to the server through the communication I/F 19. Further, the server performs the command recognition and the process of identifying a given target (person, place, building, program, music piece, or the like) on the basis of the received audio signal, and transmits the recognition results and the access destination information corresponding to the identified given target to the signal processing apparatus 1.

Additionally, the present technology may also be configured as below.

(1)

An information processing system including:

a recognizing unit configured to recognize a first target and a second target on the basis of signals detected by a plurality of sensors arranged around a specific user;

an identifying unit configured to identify the first target and the second target recognized by the recognizing unit;

an estimating unit configured to estimate a position of the specific user in accordance with the a signal detected by any one of the plurality of sensors; and a signal processing unit configured to process each of signals acquired from sensors around the first target and the second target identified by the identifying unit in a manner that, when being output from a plurality of actuators arranged around the specific user, the signals are localized near the position of the specific user estimated by the estimating unit.

(2)

The information processing system according to (1), wherein the first target is a given person and the second target is a given place, and wherein the signal processing unit processes signals acquired by sensors around the given person and signals acquired by sensors around the given place.

(3)

The information processing system according to (1), wherein the first target is a given person and the second target is a given place, and wherein the signal processing unit processes signals acquired in real time by sensors around the given person and signals that have been acquired in advance by sensors around the given place and have been accumulated.

(4)

The information processing system according to any one of (1) to (3), wherein sensors around the first target and sensors around the second target are arranged dispersedly at remote places.

(5)

The information processing system according to any one of (1) to (4), wherein the plurality of sensors arranged around the specific user are microphones, and wherein the recognizing unit recognizes the first target and the second target on the basis of audio signals detected by the microphones.

(6)

The information processing system according to any one of (1) to (4), wherein the plurality of sensors arranged around the specific user are image sensors, and wherein the recognizing unit recognizes the first target and the second target on the basis of captured images obtained by the image sensors.

(7)

The information processing system according to any one of (1) to (6), wherein sensors around the first target are of a different type from sensors around the second target.

(8)

The information processing system according to any one of (1) to (7), wherein the signal processing unit performs processes of modifying signals acquired by sensors around the first target on the basis of a characteristic of a parameter corresponding to the second target, and executing addition to signals acquired by sensors around the second target.

(9)

The information processing system according to any one of (1) to (8), wherein the signal processing unit processes each of the signals acquired from sensors around the first target and the second target in a manner that each of the signals are localized near a sense organ of the specific user.

(10)

The information processing system according to any one of (1) to (9), wherein the sensors around the first target and the second target are microphones, wherein the plurality of actuators arranged around the specific user are a plurality of speakers, and wherein the signal processing unit processes respective audio signals acquired by the microphones around the first target and the second target in a manner that a sound field is formed near a position of the specific user when output from the plurality of speakers, on the basis of respective positions of the plurality of speakers and the estimated position of the user.

(11)

The information processing system according to (10), wherein the estimating unit continuously estimates a position of the specific user, and wherein the signal processing unit processes the respective audio signals in a manner that a sound field is formed near the position of the specific user in accordance with a change in the position of the specific user.

(12)

An information processing system including:

a recognizing unit configured to recognize a first target and a second target on the basis of signals detected by sensors around a specific user;

an identifying unit configured to identify the first target and the second target recognized by the recognizing unit; and a signal processing unit configured to generate signals to be output from actuators around the specific user on the basis of signals acquired by a plurality of sensors arranged around the first target and the second target identified by the identifying unit.

(13)

The information processing system according to (12), wherein the first target is a given person and the second target is a given place, and wherein the signal processing unit processes signals acquired by a plurality of sensors arranged around the given person and signals acquired by a plurality of sensors arranged around the given place.

(14)

The information processing system according to (12), wherein the first target is a given person and the second target is a given place, and wherein the signal processing unit processes signals acquired in real time by a plurality of sensors arranged around the given person and signals that have been acquired in advance by sensors around the given place and have been accumulated.

(15)

A storage medium having a program stored therein, the program being for causing a computer to function as:

a recognizing unit configured to recognize a first target and a second target on the basis of signals detected by a plurality of sensors arranged around a specific user;

an identifying unit configured to identify the first target and the second target recognized by the recognizing unit;

an estimating unit configured to estimate a position of the specific user in accordance with the a signal detected by any one of the plurality of sensors; and a signal processing unit configured to process each of signals acquired from sensors around the first target and the second target identified by the identifying unit in a manner that, when being output from a plurality of actuators arranged around the specific user, the signals are localized near the position of the specific user estimated by the estimating unit.

(16)

A storage medium having a program stored therein, the program being for causing a computer to function as:

a recognizing unit configured to recognize a first target and a second target on the basis of signals detected by sensors around a specific user;

an identifying unit configured to identify the first target and the second target recognized by the recognizing unit; and a signal processing unit configured to generate signals to be output from actuators around the specific user on the basis of signals acquired by a plurality of sensors arranged around the first target and the second target identified by the identifying unit.

REFERENCE SIGNS LIST 1, 1A, 1B signal processing apparatus
3, 3' management server
5 network
6 user ID DB
7 communication terminal
8 service log DB
9 user individual DB
10, 10A, 10B, 10C microphone
11 amplifying/analog-to-digital converter (ADC) unit
13, 200 signal processing unit
15 microphone position information database (DB)
16 user position estimating unit
17 recognizing unit
18 identifying unit
19 communication interface (I/F)
20, 20A, 20B, 20C speaker
23 digital-to-analog converter (DAC)/amplifying unit
25 user authentication unit
32 managing unit
33, 34 searching unit
35 user position information DB
36 acoustic information parameter DB
37 acoustic content DB
40, 40-1, 40-2, 40-3 acoustically closed surface
42 sound field
43, 43-1, 43-2, 43-3 closed surface
60, 65 tag
100, 100-1 to 100-4 device
131 microphone array processing unit
133, 210 high S/N processing unit
135, 220 sound field reproduction signal processing unit
136 convolution unit
137, 139 howling reduction unit
138 matrix convolution unit

The invention claimed is:

1. An information processing system, comprising:
a recognizing unit configured to recognize a first target located at a first site based on a plurality of first signals detected by a plurality of first sensors arranged around a specific user located at a second site;
an identifying unit configured to identify the first target recognized by the recognizing unit;
an estimating unit configured to estimate a position of the specific user based on a first signal detected by one of the plurality of first sensors; and
a signal processing unit configured to:
modify each of a plurality of second signals acquired from a plurality of second sensors arranged around the first target based on an acoustic information parameter of a third site other than the first site and the second site; and
output the modified plurality of second signals from a plurality of actuators arranged around the specific user, such that the modified plurality of second signals are localized near the estimated position of the specific user.

2. The information processing system according to claim 1,
wherein the first target is a given person, and
wherein the signal processing unit is further configured to modify the plurality of second signals acquired by the plurality of second sensors arranged around the given person based on the acoustic information parameter measured at the third site.

3. The information processing system according to claim 1,
wherein the first target is a given person, and
wherein the signal processing unit is further configured to modify the plurality of second signals acquired in real time by the plurality of second sensors arranged around the given person based on the acoustic information parameter of the third site acquired in advance.

4. The information processing system according to claim 1, wherein the plurality of second sensors around the first target are arranged dispersedly at the first site.

5. The information processing system according to claim 1,
wherein the plurality of first sensors arranged around the specific user are microphones, and
wherein the recognizing unit is further configured to recognize the first target based on audio signals detected by the microphones.

6. The information processing system according to claim 1,
wherein the plurality of first sensors arranged around the specific user are image sensors, and
wherein the recognizing unit is further configured to recognize the first target based on captured images obtained by the image sensors.

7. The information processing system according to claim 1, wherein the plurality of second sensors arranged around the first target are of a different type from a plurality of third sensors arranged at a second target, the second target corresponds to the third site.

8. The information processing system according to claim 1, wherein the signal processing unit is further configured to modify the plurality of second signals acquired by the plurality of second sensors arranged around the first target based on the acoustic information parameter corresponding to the third site, and execute addition to a plurality of third signals acquired by a plurality of third sensors arranged at the third site.

9. The information processing system according to claim 1, wherein the signal processing unit is further configured to process each of the plurality of second signals acquired from the plurality of second sensors arranged around the first target such that each of the plurality of second signals are localized near a sense organ of the specific user.

10. The information processing system according to claim 1,
wherein the plurality of second sensors arranged around the first target are microphones,
wherein the plurality of actuators arranged around the specific user are a plurality of speakers, and
wherein the signal processing unit is further configured to modify respective audio signals acquired by the microphones arranged around the first target, such that a sound field is formed near the estimated position of the specific user based on output of the modified audio signals from the plurality of speakers and based on respective positions of the plurality of speakers and the estimated position of the specific user.

11. The information processing system according to claim 10,
wherein the estimating unit is further configured to continuously estimate the position of the specific user, and
wherein the signal processing unit is further configured to process the respective audio signals such that the sound field is formed near the position of the specific user based on a change in the position of the specific user.

12. An information processing system, comprising:
a recognizing unit configured to recognize a command corresponding to a target located at a first site based on a plurality of first signals detected by a plurality of first sensors arranged around a specific user located at a second site;
an identifying unit configured to identify the target based on the recognized command; and
a signal processing unit configured to generate signals to be output from actuators arranged around the specific user based on a plurality of second signals acquired by a plurality of second sensors arranged around the target and an acoustic information parameter of a third site other than the first site and the second site.

13. The information processing system according to claim 12,
wherein the target is a given person, and
wherein the signal processing unit is further configured to modify the plurality of second signals acquired by the plurality of second sensors arranged around the given person based on the acoustic information parameter measured at the third site.

14. The information processing system according to claim 12,
wherein the target is a given person, and
wherein the signal processing unit is further configured to modify the plurality of second signals acquired in real time by the plurality of second sensors arranged around the given person based on the acoustic information parameter of the third site acquired in advance.

15. A non-transitory computer-readable medium having stored thereon, computer-executable instructions for causing an information processing apparatus to execute operations, comprising:
recognizing a target located at a first site based on a plurality of first signals detected by a plurality of first sensors arranged around a specific user located at a second site;
identifying the recognized target;
estimating a position of the specific user based on a first signal detected by one of the plurality of first sensors;
modifying each of a plurality of second signals acquired from a plurality of second sensors arranged around the identified target based on an acoustic information parameter of a third site other than the first site and the second site; and
outputting the modified plurality of second signals from a plurality of actuators arranged around the specific user, such that the modified plurality of second signals are localized near the estimated position of the specific user.

16. A non-transitory computer-readable medium having stored thereon, computer-executable instructions for causing an information processing apparatus to execute operations, comprising:
recognizing a command corresponding to a target located at a first site based on a plurality of first signals detected by a plurality of first sensors arranged around a specific user located at a second site;
identifying the target based on the recognized command; and
generating signals to be output from actuators arranged around the specific user based on a plurality of second signals acquired by a plurality of second sensors arranged around the identified target and based on an acoustic information parameter of a third site other than the first site and the second site.

17. The information processing system according to claim 1, wherein the first site, the second site and the third site are remotely located from one another.

* * * * *